(12) United States Patent
Wu et al.

(10) Patent No.: US 12,549,319 B2
(45) Date of Patent: Feb. 10, 2026

(54) SUBBAND LEVEL CONSTELLATION SHAPING

(71) Applicant: QUALCOMM Incorporated, San Diego, CA (US)

(72) Inventors: Liangming Wu, Beijing (CN); Changlong Xu, Beijing (CN); Jian Li, Shanghai (CN); Kangqi Liu, San Diego, CA (US); Kexin Xiao, Shanghai (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/044,973

(22) PCT Filed: Nov. 18, 2020

(86) PCT No.: PCT/CN2020/129740
§ 371 (c)(1),
(2) Date: Mar. 10, 2023

(87) PCT Pub. No.: WO2022/104588
PCT Pub. Date: May 27, 2022

(65) Prior Publication Data
US 2023/0403123 A1 Dec. 14, 2023

(51) Int. Cl.
*H04L 5/00* (2006.01)
*H04L 27/34* (2006.01)

(52) U.S. Cl.
CPC ........ *H04L 5/0094* (2013.01); *H04L 27/3483* (2013.01)

(58) Field of Classification Search
None
See application file for complete search history.

(56) References Cited

U.S. PATENT DOCUMENTS

2012/0226505 A1  9/2012  Lin et al.

FOREIGN PATENT DOCUMENTS

| CN | 107113100 A | 8/2017 |
| CN | 108966333 A | 12/2018 |
| WO | WO-2016053566 A1 | 4/2016 |

OTHER PUBLICATIONS

International Search Report and Written Opinion—PCT/CN2020/129740—ISA/EPO—Apr. 27, 2021.

*Primary Examiner* — Abdelillah Elmejjarmi
(74) *Attorney, Agent, or Firm* — Holland & Hart LLP

(57) ABSTRACT

Methods, systems, and devices for wireless communication at a user equipment (UE) are described. A user equipment (UE) may receive a configuration indicating a mapping between a set of multiple subband indices and a set of multiple encoding parameter sets. The UE may apply, at a first distribution matcher, a first encoding parameter set to a first subset of a bit stream. The UE may also apply, at a second distribution matcher, a second encoding parameter set to a second subset of the bit stream. The a first encoding parameter set may be associated with a first subband index and the second encoding parameter set may be associated with a second subband index. The UE may then transmit a first modulated bit stream on a first subband, and a second modulated bit stream on a second subband.

30 Claims, 16 Drawing Sheets

SUBBAND LEVEL CONSTELLATION SHAPING

CROSS REFERENCE

The present application is a 371 national stage filing of International PCT Application No. PCT/CN2020/129740 by W U et al. entitled "SUBBAND LEVEL CONSTELLATION SHAPING," filed Nov. 18, 2020, which is assigned to the assignee hereof, and which is expressly incorporated by reference in its entirety herein.

FIELD OF TECHNOLOGY

The following relates to wireless communication at a user equipment (UE), including subband level constellation shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Information transmitted between network nodes may be encoded to improve the reliability of the transmitted information. For example, an encoding scheme may provide redundancy, which may be used to correct errors that result from the transmission environment (e.g., path loss, obstacles, etc.). Some encoding techniques may be improved.

SUMMARY

The described techniques relate to improved methods, systems, devices, and apparatuses that support subband level constellation shaping. Generally, the described techniques provide for constellation shaping in the presence of frequency selective fading channel. A device may receive a configuration indicating a mapping between a set of subband indices and a set of encoding parameter sets. The set of encoding parameter sets may include coding rate, modulation order and distribution matcher parameters. The device may identify a first subband index and a second subband index associated with a set of source bits. Upon identifying the subband indices, the device may identify a first encoding parameter set corresponding to the first subband index and a second encoding parameter set corresponding to the second subband index. The device may apply, at a first distribution matcher, the first encoding parameter set to a first subset of a bit stream. Additionally or alternatively, the device may apply, at a second distribution matcher, a second encoding parameter set to a second subset of the bit stream. Thus, the device may employ multiple distribution matchers to provide for a method to modulate bit streams such that bit streams of a different subband modulates with a different modulation order.

A method for wireless communication at a user equipment (UE) is described. The method may include receiving, from a base station, a configuration indicating a mapping between a set of multiple subband indices and a set of multiple encoding parameter sets, applying, at a first distribution matcher, a first encoding parameter set of the set of multiple encoding parameter sets to a first subset of a bit stream, where the first encoding parameter set is associated with a first subband index, applying, at a second distribution matcher, a second encoding parameter set of the set of multiple encoding parameter sets to a second subset of the bit stream, where the second encoding parameter set is associated with a second subband index, transmitting, on a first subband corresponding to the first subband index, a first modulated bit stream corresponding to the first distribution matcher, and transmitting, on a second subband corresponding to the second subband index, a second modulated bit stream corresponding to the second distribution matcher.

An apparatus for wireless communication at a UE is described. The apparatus may include a processor, memory in electronic communication with the processor, and instructions stored in the memory. The instructions may be executable by the processor to cause the apparatus to receive, from a base station, a configuration indicating a mapping between a set of multiple subband indices and a set of multiple encoding parameter sets, apply, at a first distribution matcher, a first encoding parameter set of the set of multiple encoding parameter sets to a first subset of a bit stream, where the first encoding parameter set is associated with a first subband index, apply, at a second distribution matcher, a second encoding parameter set of the set of multiple encoding parameter sets to a second subset of the bit stream, where the second encoding parameter set is associated with a second subband index, transmit, on a first subband corresponding to the first subband index, a first modulated bit stream corresponding to the first distribution matcher, and transmit, on a second subband corresponding to the second subband index, a second modulated bit stream corresponding to the second distribution matcher.

Another apparatus for wireless communication at a UE is described. The apparatus may include means for receiving, from a base station, a configuration indicating a mapping between a set of multiple subband indices and a set of multiple encoding parameter sets, means for applying, at a first distribution matcher, a first encoding parameter set of the set of multiple encoding parameter sets to a first subset of a bit stream, where the first encoding parameter set is associated with a first subband index, means for applying, at a second distribution matcher, a second encoding parameter set of the set of multiple encoding parameter sets to a second subset of the bit stream, where the second encoding parameter set is associated with a second subband index, means for transmitting, on a first subband corresponding to the first subband index, a first modulated bit stream corresponding to the first distribution matcher, and means for transmitting, on a second subband corresponding to the second subband index, a second modulated bit stream corresponding to the second distribution matcher.

A non-transitory computer-readable medium storing code for wireless communication at a UE is described. The code may include instructions executable by a processor to receive, from a base station, a configuration indicating a mapping between a set of multiple subband indices and a set of multiple encoding parameter sets, apply, at a first distribution matcher, a first encoding parameter set of the set of multiple encoding parameter sets to a first subset of a bit stream, where the first encoding parameter set is associated with a first subband index, apply, at a second distribution matcher, a second encoding parameter set of the set of multiple encoding parameter sets to a second subset of the bit stream, where the second encoding parameter set is associated with a second subband index, transmit, on a first subband corresponding to the first subband index, a first modulated bit stream corresponding to the first distribution matcher, and transmit, on a second subband corresponding to the second subband index, a second modulated bit stream corresponding to the second distribution matcher.

Some examples of the method, apparatuses, and non-transitory computer-readable medium described herein may further include operations, features, means, or instructions for transmitting, to the base station, a capability of the UE to support a set of multiple distribution matchers, where the configuration indicating the mapping between the set of multiple subband indices and the set of multiple encoding parameter sets may be based on the transmitted capability.

Some examples of the method, apparatuses, and non-transitory computer-readable medium described herein may further include operations, features, means, or instructions for identifying a capability of the UE to support a subset of the set of multiple encoding parameter sets and selecting the subset of the set of multiple encoding parameter sets from the set of multiple encoding parameter sets based on the received configuration, where the subset of the set of multiple encoding parameter sets includes the first encoding parameter set and the second encoding parameter set.

Some examples of the method, apparatuses, and non-transitory computer-readable medium described herein may further include operations, features, means, or instructions for determining that the first subset of the bit stream may be associated with the first subband index and the second subset of the bit stream may be associated with the second subband index, identifying the first encoding parameter set based on the mapping between the first subband index and the first encoding parameter set, and identifying the second encoding parameter set based on the mapping between the second subband index and the second encoding parameter set.

In some examples of the method, apparatuses, and non-transitory computer-readable medium described herein, identifying the first encoding parameter set may include operations, features, means, or instructions for identifying a modulation order and a distribution matcher parameter associated with the first distribution matcher, where applying the first encoding parameter set includes applying the modulation order and the distribution matcher parameter at the first distribution matcher.

In some examples of the method, apparatuses, and non-transitory computer-readable medium described herein, identifying the second encoding parameter set may include operations, features, means, or instructions for identifying a modulation order and a distribution matcher parameter associated with the second distribution matcher, where applying the second encoding parameter set includes applying the modulation order and the distribution matcher parameter at the second distribution matcher.

In some examples of the method, apparatuses, and non-transitory computer-readable medium described herein, the first encoding parameter set includes a first distribution matcher distribution value and the second encoding parameter set includes a second distribution matcher distribution value.

Some examples of the method, apparatuses, and non-transitory computer-readable medium described herein may further include operations, features, means, or instructions for generating a first output sequence based on applying the first encoding parameter set at the first distribution matcher and generating a second output sequence based on applying the second encoding parameter set at the second distribution matcher.

Some examples of the method, apparatuses, and non-transitory computer-readable medium described herein may further include operations, features, means, or instructions for concatenating the first output sequence and the second output sequence to generate a concatenated sequence and applying channel coding to the concatenated sequence based on a code rate parameter.

In some examples of the method, apparatuses, and non-transitory computer-readable medium described herein, the code rate parameter may be included in the first encoding parameter set and the second encoding parameter set. In some examples of the method, apparatuses, and non-transitory computer-readable medium described herein, a common code rate parameter may be associated with the first encoding parameter set and the second encoding parameter set.

Some examples of the method, apparatuses, and non-transitory computer-readable medium described herein may further include operations, features, means, or instructions for receiving, from the base station, a control signaling including the configuration indicating the mapping between the set of multiple subband indices and the set of multiple encoding parameter sets.

In some examples of the method, apparatuses, and non-transitory computer-readable medium described herein, the control signaling includes at least one of a downlink control information and a radio resource control signaling. In some examples of the method, apparatuses, and non-transitory computer-readable medium described herein, the first subband index and the second subband index may be associated with at least one of different subcarriers and different subband channels.

A method for wireless communication at a base station is described. The method may include identifying a configuration indicating a mapping between a set of multiple subband indices and a set of multiple encoding parameter sets, applying, at a first distribution matcher, a first encoding parameter set of the set of multiple encoding parameter sets to a first subset of a bit stream, where the first encoding parameter set is associated with a first subband index, applying, at a second distribution matcher, a second encoding parameter set of the set of multiple encoding parameter sets to a second subset of the bit stream, where the second encoding parameter set is associated with a second subband index, transmitting, on a first subband corresponding to the first subband index, a first modulated bit stream corresponding to the first distribution matcher, and transmitting, on a second subband corresponding to the second subband index, a second modulated bit stream corresponding to the second distribution matcher.

An apparatus for wireless communication at a base station is described. The apparatus may include a processor, memory in electronic communication with the processor, and instructions stored in the memory. The instructions may be executable by the processor to cause the apparatus to identify a configuration indicating a mapping between a set of multiple subband indices and a set of multiple encoding parameter sets, apply, at a first distribution matcher, a first encoding parameter set of the set of multiple encoding parameter sets to a first subset of a bit stream, where the first encoding parameter set is associated with a first subband index, apply, at a second distribution matcher, a second encoding parameter set of the set of multiple encoding parameter sets to a second subset of the bit stream, where the second encoding parameter set is associated with a second subband index, transmit, on a first subband corresponding to the first subband index, a first modulated bit stream corresponding to the first distribution matcher, and transmit, on a second subband corresponding to the second subband index, a second modulated bit stream corresponding to the second distribution matcher.

Another apparatus for wireless communication at a base station is described. The apparatus may include means for identifying a configuration indicating a mapping between a set of multiple subband indices and a set of multiple encoding parameter sets, means for applying, at a first distribution matcher, a first encoding parameter set of the set of multiple encoding parameter sets to a first subset of a bit stream, where the first encoding parameter set is associated with a first subband index, means for applying, at a second distribution matcher, a second encoding parameter set of the set of multiple encoding parameter sets to a second subset of the bit stream, where the second encoding parameter set is associated with a second subband index, means for transmitting, on a first subband corresponding to the first subband index, a first modulated bit stream corresponding to the first distribution matcher, and means for transmitting, on a second subband corresponding to the second subband index, a second modulated bit stream corresponding to the second distribution matcher.

A non-transitory computer-readable medium storing code for wireless communication at a base station is described. The code may include instructions executable by a processor to identify a configuration indicating a mapping between a set of multiple subband indices and a set of multiple encoding parameter sets, apply, at a first distribution matcher, a first encoding parameter set of the set of multiple encoding parameter sets to a first subset of a bit stream, where the first encoding parameter set is associated with a first subband index, apply, at a second distribution matcher, a second encoding parameter set of the set of multiple encoding parameter sets to a second subset of the bit stream, where the second encoding parameter set is associated with a second subband index, transmit, on a first subband corresponding to the first subband index, a first modulated bit stream corresponding to the first distribution matcher, and transmit, on a second subband corresponding to the second subband index, a second modulated bit stream corresponding to the second distribution matcher.

Some examples of the method, apparatuses, and non-transitory computer-readable medium described herein may further include operations, features, means, or instructions for receiving, from a UE, a capability of the UE to support a set of multiple distribution matchers and transmitting, to the UE, the configuration indicating the mapping between the set of multiple subband indices and the set of multiple encoding parameter sets, where the configuration may be identified based on the received capability.

Some examples of the method, apparatuses, and non-transitory computer-readable medium described herein may further include operations, features, means, or instructions for determining that the first subset of the bit stream may be associated with the first subband index and the second subset of the bit stream may be associated with the second subband index, identifying the first encoding parameter set based on the mapping between the first subband index and the first encoding parameter set, and identifying the second encoding parameter set based on the mapping between the second subband index and the second encoding parameter set.

In some examples of the method, apparatuses, and non-transitory computer-readable medium described herein, identifying the first encoding parameter set may include operations, features, means, or instructions for identifying a modulation order and a distribution matcher parameter associated with the first distribution matcher, where applying the first encoding parameter set includes applying the modulation order and the distribution matcher parameter at the first distribution matcher.

In some examples of the method, apparatuses, and non-transitory computer-readable medium described herein, identifying the second encoding parameter set may include operations, features, means, or instructions for identifying a modulation order and a distribution matcher parameter associated with the second distribution matcher, where applying the second encoding parameter set includes applying the modulation order and the distribution matcher parameter at the second distribution matcher.

In some examples of the method, apparatuses, and non-transitory computer-readable medium described herein, the first encoding parameter set includes a first distribution matcher distribution value and the second encoding parameter set includes a second distribution matcher distribution value.

Some examples of the method, apparatuses, and non-transitory computer-readable medium described herein may further include operations, features, means, or instructions for generating a first output sequence based on applying the first encoding parameter set at the first distribution matcher and generating a second output sequence based on applying the second encoding parameter set at the second distribution matcher.

Some examples of the method, apparatuses, and non-transitory computer-readable medium described herein may further include operations, features, means, or instructions for concatenating the first output sequence and the second output sequence to generate a concatenated sequence and applying channel coding to the concatenated sequence based on a code rate parameter.

In some examples of the method, apparatuses, and non-transitory computer-readable medium described herein, the code rate parameter may be included in the first encoding parameter set and the second encoding parameter set. In some examples of the method, apparatuses, and non-transitory computer-readable medium described herein, a common code rate parameter may be associated with the first encoding parameter set and the second encoding parameter set.

Some examples of the method, apparatuses, and non-transitory computer-readable medium described herein may further include operations, features, means, or instructions for transmitting, to a UE, a control signaling including the configuration indicating the mapping between the set of multiple subband indices and the set of multiple encoding parameter sets.

In some examples of the method, apparatuses, and non-transitory computer-readable medium described herein, the control signaling includes at least one of a downlink control information and a radio resource control signaling. In some examples of the method, apparatuses, and non-transitory computer-readable medium described herein, the first subband index and the second subband index may be associated with at least one of different subcarriers and different subband channels.

DETAILED DESCRIPTION

Figure 1:
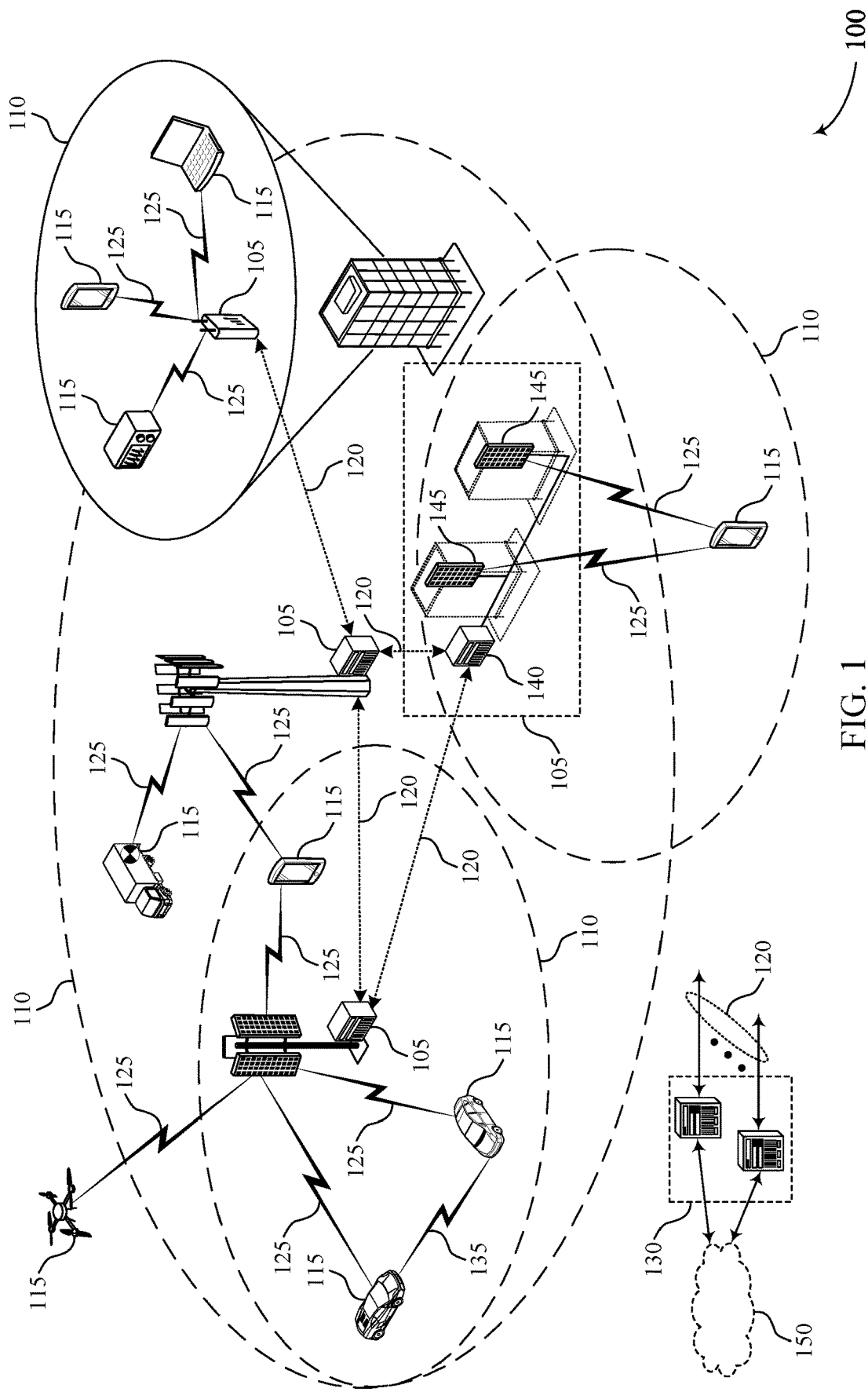
FIG. 1 illustrates an example of a wireless communications system that supports subband level constellation shaping in accordance with aspects of the present disclosure.

In some wireless communications systems, a network node (e.g., a user equipment (UE), a base station, or another wireless device) may encode source information (e.g., packets) and then transmit the encoded information, where the encoding may improve the reliability with which a destination node may recover the original source information (e.g., through redundancy or other mechanisms). The source information may be represented by a set of source symbols, and based on the operative encoding scheme, an encoder may generate a corresponding set of encoded symbols (which may be transmitted by a transmitting device and received by a receiving device).

Wireless devices may employ the use of constellation shaping as part of the signal modulation process. Some techniques for constellation shaping employ a single distribution matcher that applies distribution matching parameters to a bit sequence. However, such constellation shaping techniques may not consider the fading channel effect. In particular, the use of a single distribution matcher may not consider frequency selective fading channel when a particular waveform is applied. Aspects of the present disclosure provide for constellation shaping in the presence of frequency selective fading channel.

According to one or more aspects, a first wireless device (e.g., user equipment (UE) or base station) may receive a configuration indicating a mapping between subband index and distribution matcher parameters. In some examples, the first wireless device may transmit a capability to support multiple distribution matchers and a second wireless device (e.g., a base station) may transmit the configuration based on the capability. In another example, the first wireless device may select one or more supported distribution matcher parameters based on a capability. For instance, the first wireless device may select encoding parameters based on determining that a subset of combinations of coding rate, modulation order and distribution matcher parameters are supported by the first wireless device. Upon selecting the parameters to apply for modulating a bit stream of a particular subband, the first wireless device may apply the corresponding parameters at a first distribution matcher and a second distribution matcher and transmit the modulated bit streams on a first subband and a second subband.

Subband level constellation shaping may correspond to efficient transmission of symbols, and thus—may be beneficial (e.g., may conserve spectral or other system resources, among other benefits). UEs capable of subband level constellation shaping may utilize the techniques described herein to experience power saving, such as reduced power consumption and extended battery life while ensuring reliable and efficient communications between UEs and base stations. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. Additionally or alternatively, the techniques employed by the described UEs may provide time and power savings. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to subband level constellation shaping.

FIG. 1 illustrates an example of a wireless communications system 100 that supports subband level constellation shaping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may employ the use of constellation shaping as part of the signal modulation process. Some techniques for constellation shaping may employ a single distribution matcher that applies distribution matching parameters to a bit sequence. Such distribution matchers may not consider the fading channel effect and may apply distribution matching parameters equally across all of the subbands of a channel.

Aspects of the present disclosure provide for a signal modulation process considering the SNR of different subcarriers (i.e., when frequency selective fading exist, SNR variation of different subcarriers exist). In particular, aspects depicted herein provide a framework where different distribution matchers are using different parameters for different subcarriers or subband channels. According to one or more examples, a wireless device (e.g., UE 115 or base station 105) may receive a configuration indicating a mapping between a subband index and one or more distribution matcher parameters. Upon selecting the parameters to apply for modulating a bit stream of a particular subband, the wireless device may apply the corresponding parameters at a first distribution matcher and a second distribution matcher. The wireless device may then transmit the modulated bit streams on a first subband and a second subband respectively.

Figure 2:
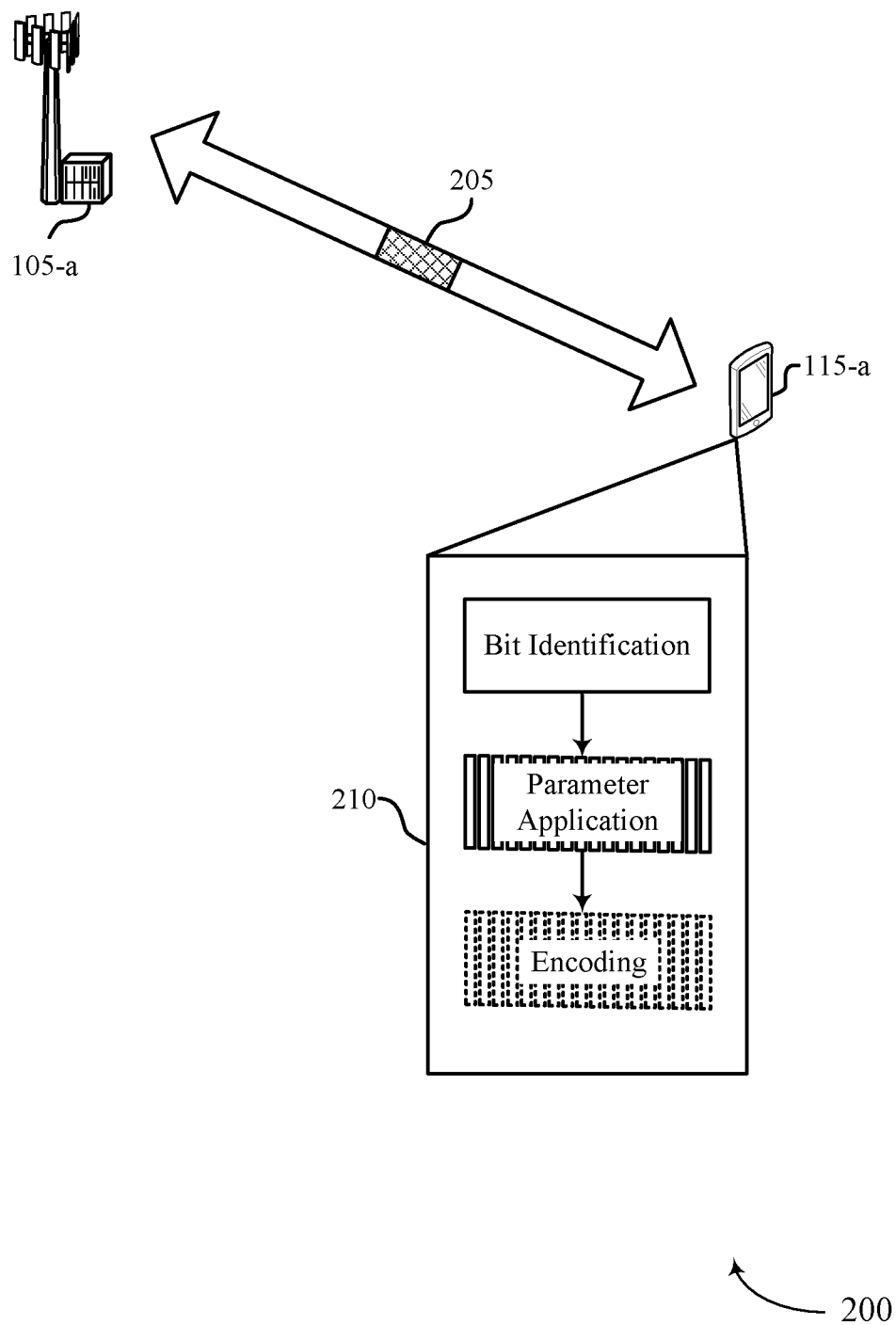
FIG. 2 illustrates an example of a wireless communications system that supports subband level constellation shaping in accordance with aspects of the present disclosure.

FIG. 2 illustrates an example of a wireless communications system 200 that supports subband level constellation shaping in accordance with aspects of the present disclosure. In some examples, the wireless communications system 200 may implement aspects of wireless communications system 100. For example, the wireless communications system 200 may include a base station 105-a and a UE 115-a, which may be examples of UEs 115 and base stations 105 described herein.

In some aspects, the UE 115-a may be configured or otherwise acting as a transmitting device performing a wireless transmission to base station 105-a, which may be configured or otherwise acting as a receiving device. However, it is to be understood that the UE 115-a may implement various aspects of the described techniques when acting as or otherwise configured as a receiving device performing a wireless transmission with the base station 105-a, which would be configured or otherwise acting as a transmitting device.

Some devices in a wireless network may employ the use of constellation shaping as part of the signal modulation process. To approach the Shannon capacity, the transmission of quadrature amplitude modulation may be non-uniformly distributed. For instance, uniform quadrature amplitude modulation may be 1.53 dB away from a capacity line asymptotically. In some examples, Gaussian distribution of constellation symbols may be achieved using two methods. In a first example, a geometric constellation shaping may be achieved using equal probability constellation with Gaussian amplitude distribution. In a second example, a probabilistic constellation shaping may be achieved using uniform quadrature amplitude modulation with non-equal probability of constellation.

Some techniques for constellation shaping may employ a single distribution matcher that applies distribution matching parameters to a bit sequence. A distribution matcher may include software, hardware, or any combination of components operable to apply one or more parameters to a sequence of bits to achieve an output sequence of bits for purposes of constellation shaping as described herein. Some constellation shaping techniques may not consider the fading channel effect, which can result in a SNR variations (e.g., a 30-40 dB SNR variation). That is, in some techniques, the distribution matching parameters are applied equally across all of the subbands of a channel.

As depicted herein, some wireless devices in a wireless network may employ the use of a framework of constellation shaping in the presence of frequency selective fading channel. In some examples, a coded modulation scheme may be implemented at a transmitter and a receiver. At the transmitter, the concatenation of a distribution matcher and a systematic binary encoder may perform probabilistic signal shaping and channel coding. At the receiver, the output of a bitwise demapper may be inputted into a binary decoder. In some examples, no iterative demapping may be performed. The transmitter and receiver may achieve rate adaption by adjusting the input distribution and the transmission power. In some examples, the subband level constellation shaping described herein may be applied to bipolar amplitude shift keying (ASK) constellations with equidistant signal points and may be directly applicable to two-dimensional quadrature amplitude modulation.

In some examples, data of K length information bits may be partitioned into 2 parts. For instance, a transmitter (e.g., UE 115-a) may partition K length information bits into a first part (e.g., Part 1) including k-i bits and a second part (e.g., Part 2) including i bits. A distribution matcher may transform the first part (e.g., Part 1) bit sequence into m-length amplitude sequence. The transmitter may then transform each of the amplitude sequences into binary sequences using a b( ) function. For example, the transmitter may transform an M-array amplitude to generate log 2(M)*m binary bits using binary mapping. The transmitter may apply channel coding to the output of the distribution matcher and second part (e.g., Part 2) including i information bits to create parity bits having length n. The second part (e.g., Part 2) including i information bits and bits outputted from the channel coding are concatenated into an m-length binary sequence. The transmitter may then multiply concatenated output bits a generated amplitude output, and may then modulate the information bits. When frequency selective fading exist, SNR variation of different subcarriers may also exist.

One or more aspects of the present disclosure provides for a framework where a signal modulation process considers the SNR of different subcarriers (i.e., when frequency selective fading exist, SNR variation of different subcarriers exist). In particular, one or more aspects of the present disclosure provides for a modulation process that is adaptive to the SNR of different subcarriers. A transmitting device may modulate bit streams such that bit streams of a different subband modulates with a different modulation order. In the example of FIG. 2, the UE 115-a may receive a configuration 205 indicating a mapping between subband index and distribution matcher parameters. In some instances, the UE 115-a may receive the configuration 205 included in a control signal. The control signal may include at least one of a downlink control information and a radio resource control signaling. In some examples, the base station 105-a may transmit a configuration including a mapping between a set of subband indices and a set of encoding parameter sets. The encoding parameter sets may include coding rate, modulation order and distribution matcher parameter. The configuration 205 may include Table 1 as described herein.

TABLE 1

| Idx | Coding rate | Modulation order | DM parameter |
|-----|-------------|------------------|--------------|
| 0 | 0.6 | 16 | 0 |
| 1 | 0.6 | 16 | 0.01 |
| 2 | 0.8 | 64 | 0.02 |
| 3 | 0.8 | 256 | 0.002 |
| 4 | 0.9 | 64 | 0.01 |
| 5 | 0.9 | 256 | 0.001 |
| 6 | 0.9 | 256 | 0.002 |

The UE 115-a may identify subband indices associated with a bit stream and may then identify corresponding encoding parameters. For instance, upon identifying subband indices, the UE 115-a may determine corresponding indices in accordance with Table 2. That is, each subband index may map to a particular index as shown in Table 2 and the particular index may map to encoding parameter sets as shown in Table 1.

TABLE 2

| Subband Index | Selected Idx |
|---------------|--------------|
| 0 | 4 |
| 1 | 5 |
| 2 | 5 |
| 3 | 4 |

The UE may be restricted to select the MCS Idx with the same coding rate, or modulation order, or both. For instance, if the same coding rate and modulation order is allowed in a subband level distribution matcher parameter selection, then the UE may be allowed to select Idx 5 and 6 for all subbands. Additionally or alternatively, if the same coding rate and modulation order is allowed in a subband level distribution matcher parameter selection, then the UE may be allowed to select Idx 0 and 1 for all subbands. As described herein, an index 0 maps to coding rate 0.6, modulation order 16, and distribution matcher parameter 0, an index 1 maps to coding rate 0.6, modulation order 16, and distribution matcher parameter 0.01, an index 2 maps to coding rate 0.8, modulation order 64, and distribution matcher parameter 0.02, an index 3 maps to coding rate 0.8, modulation order 256, and distribution matcher parameter 0.002, an index 4 maps to coding rate 0.9, modulation order 64, and distribution matcher parameter 0.01, and an index 5 maps to coding rate 0.9, modulation order 256, and distribution matcher parameter 0.001.

In some examples, the UE 115-a may transmit, to the base station 105-a, a capability of the UE 115-a to support a set of distribution matchers. In some examples, the configuration 205 indicating the mapping between the set of subband indices and the set of encoding parameter sets may be based on the transmitted capability. Additionally or alternatively, the UE 115-a may identify a capability of the UE 115-a to support a subset of the set of encoding parameter sets (as described in Table 1). Accordingly, the UE 115-a may select the subset of the set of encoding parameter sets from the set of encoding parameter sets based on the received configuration 205. In some cases, the subset of the set of encoding parameter sets may include a first encoding parameter set and a second encoding parameter set. The UE 115-a may determine that the UE 115-a is configured to support a subset of the set of encoding parameter sets as depicted in Table 3.

TABLE 3

| Idx | Coding rate | Modulation order | DM parameter |
|---|---|---|---|
| 0 | 0.6 | 16 | 0 |
| 1 | 0.6 | 16 | 0.01 |
| 2 | 0.8 | 64 | 0.02 |
| 3 | 0.8 | 256 | 0.002 |
| 4 | 0.9 | 64 | 0.01 |

At 210, the UE 115-a may thus identify bits for transmission and may select encoding parameter sets for the identified bits. Upon selecting the parameters to apply for modulating a bit stream of a particular subband, the UE 115-a may apply the corresponding parameters at a first distribution matcher parameter and a second distribution matcher parameter. The UE 115-a may then transmit the modulated bit streams on a first subband and a second subband. In some examples, each subband may be associated with different modulation and/or different distribution matcher distribution (v). For instance, subband 1 may be associated with (4PAM, v=v1) and subband 2 may be associated with (8PAM, v=v2). Additionally or alternatively, a common code rate may be configured by the base station 105-a. For examples, a common code rate parameter may be associated with a first encoding parameter set and a second encoding parameter set. Thus, aspects of the present disclosure provides for a subband level distribution matcher.

Figure 3:
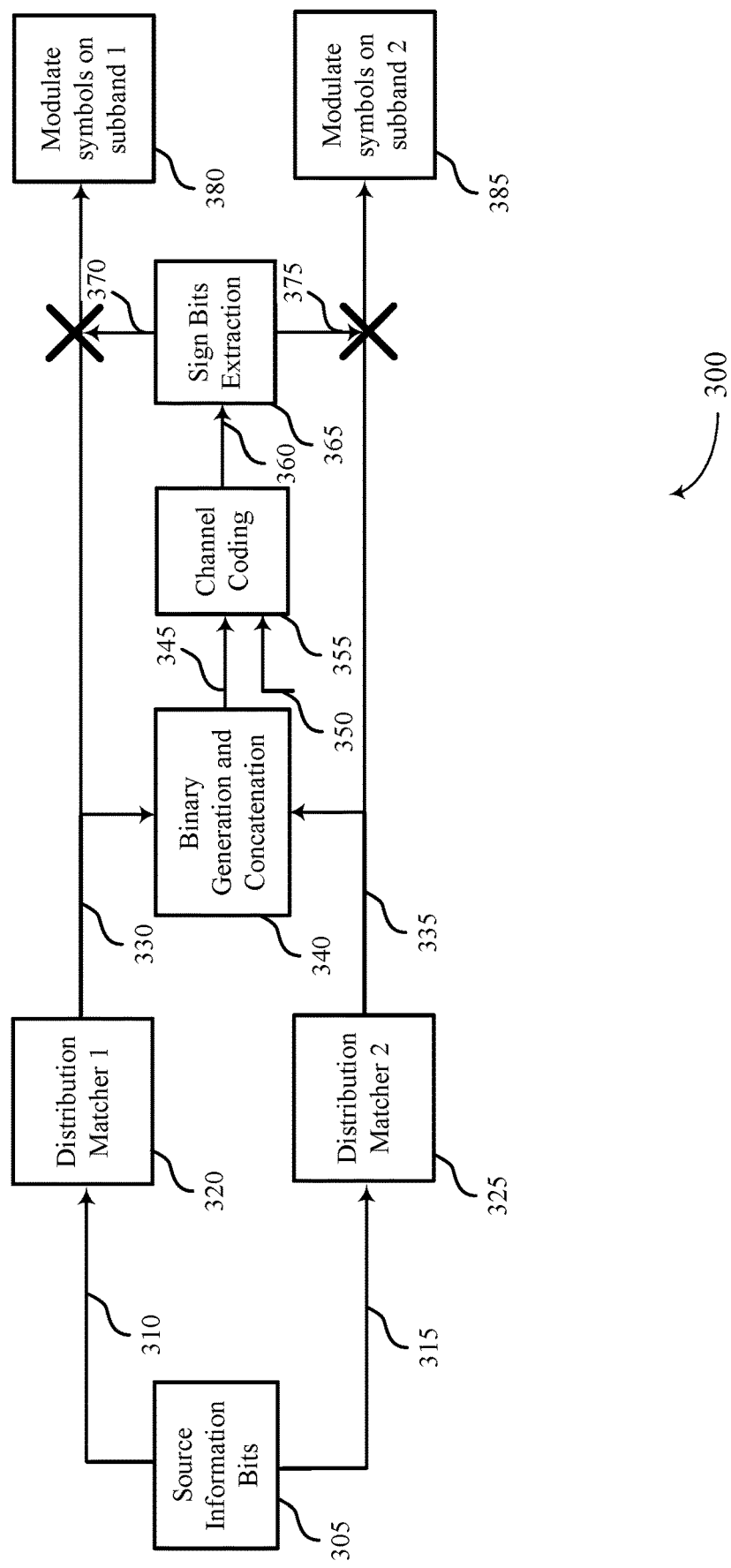
FIG. 3 illustrates an example of a process flow that supports subband level constellation shaping in accordance with aspects of the present disclosure.

FIG. 3 illustrates an example of a process flow 300 that supports subband level constellation shaping in accordance with aspects of the present disclosure. In some examples, the process flow 300 may implement aspects of wireless communications system 100 and wireless communications system 200. Process flow 300 may be implemented by a transmitting device (such as a base station 105 or a UE 115) and a receiving device (such as a base station 105 or a UE 115). In this example, the transmitting device may act as an input node and perform encoding, while the receiving device may act as an output node and perform decoding. In one example, a base station 105 may act as the input node and a UE 115 may act as the output node. In another example, a UE 115 may act as the input node while a base station 105 may act as the output node. In other examples, the communications may be between two UEs 115 or two base stations 105, or between any other quantity of nodes of the same or different types. The transmitting device may use an encoding scheme to implement subband level constellation shaping and the receiving device may use a corresponding decoding scheme. In particular, the process flow 300 may be used to implement a signal modulation process considering the SNR of different subcarriers.

At 305, the transmitting device may identify a set of bits for a wireless transmission. In some examples, the set of bits may include a set of source bits. As one example, the transmitting device may identify K length information bits. In some cases, the set of source bits may be represented as B(0)~B(k-1). The transmitting device may additionally partition K length information bits into 3 parts or subsets. For instance, a transmitter (e.g., UE 115 or base station 105) may partition K length information bits into a first part (e.g., Part 1) including i bits, a second part (e.g., Part 2) including a bits, and a third part (e.g., Part 3) including b bits.

At 310, the transmitting device may pass the second part (e.g., Part 2) including a bits to a first distribution matcher. In some cases, the second part (e.g., Part 2) including a bits may be represented as B(i)~B(i+a-1).

At 315, the transmitting device may pass the third part (e.g., Part 3) including b bits to a second distribution matcher. In some cases, the third part (e.g., Part 3) including b bits may be represented as B(i+a)~B(i+a+b-1).

At 320, the transmitting device may apply, at the first distribution matcher, a first encoding parameter set of a set of encoding parameter sets to a first subset of a bit stream (e.g., a second part including a bits represented as B(i)~B(i+a-1)). In some cases, the first encoding parameter set may be associated with a first subband index.

At 325, the transmitting device may apply, at the second distribution matcher, a second encoding parameter set of the set of encoding parameter sets to a second subset of the bit stream (e.g., a third part including b bits represented as B(i+a)~B(i+a+b-1)). In some cases, the second encoding parameter set may be associated with a second subband index. As depicted herein, the transmitting device may apply the encoding parameter sets based on a configuration received from a second wireless device.

In some examples, the transmitting device may determine that the first subset of the bit stream is associated with the first subband index and the second subset of the bit stream is associated with the second subband index. The transmitting device may identify the first encoding parameter set based on the mapping between the first subband index and the first encoding parameter set. Additionally or alternatively, the transmitting device may identify the second encoding parameter set based on the mapping between the second subband index and the second encoding parameter set. In some examples, the transmitting device may identify a modulation order and a distribution matcher parameter associated with the first distribution matcher. In some cases, applying the first encoding parameter set may include applying the modulation order and the distribution matcher parameter at the first distribution matcher. The transmitting device may also identify a modulation order and a distribution matcher parameter associated with the second distribution matcher. In some cases, applying the second encoding parameter set may include applying the modulation order and the distribution matcher parameter at the second distribution matcher.

In some examples, a distribution matcher may transform bit sequences into m-length amplitude sequence. At 330, the transmitting device may generate a first output sequence based on applying the first encoding parameter set at the first distribution matcher. The first output sequence may be represented as A1(0)~A1(m1-1).

At 335, the transmitting device may generate a second output sequence based on applying the second encoding parameter set at the second distribution matcher. The second output sequence may be represented as A2(0)~A2(m2-1).

At 340, the transmitting device may transform each of the amplitude sequences into binary sequences. For example, the first output sequence A1(0)~A1(m1-1) and the second output sequence A2(0)~A2(m2-1) may be mapped to a binary sequence. Additionally, the transmitting device may concatenate the first output sequence and the second output sequence to generate a concatenated sequence. The concatenated sequence may be represented as b(A1(0))~b(A2(m2−1)).

At 345, the transmitting device may pass the concatenated sequence b(A1(0))~b(A2(m2−1)) into a channel coding block for channel coding. At 350, the transmitting device may pass the first part of source bits including i bits into the channel coding block for channel coding. The first part of the source bits may be represented as B(0)~B(i−1).

At 355, the transmitting device may apply channel coding to the concatenated sequence and the first part of the source bits. In some cases, the channel coding may be performed by a low-density parity-check (LDPC) encoder. In some examples, the transmitting device may apply channel coding to the concatenated sequence based on a code rate parameter. In some examples, the code rate parameter may be included in the first encoding parameter set and the second encoding parameter set. Additionally or alternatively, a common code rate parameter may be associated with the first encoding parameter set and the second encoding parameter set.

At 360, the transmitting device may pass an encoder output for extraction. The encoder output may be represented as C(0)~C(n−1). At 365, the transmitter may extract sign bits from the LDPC encoder output. In some examples, the transmitter may separate the extracted sign bits with m1 length and m2 length and multiplex with outputs A1(0)~A1(m1−1) and A2(0)~A2(m2−1).

At 370, the transmitting device may send a first set of extracted sign bits for modulation. The first set of extracted sign bits may be represented as S(0)~S(m1−1). At 375, the transmitting device may send a second set of extracted sign bits for modulation. The second set of extracted sign bits may be represented as S(m1)~S(m1+m2−1).

At 380, the transmitting device may modulate symbols on a first subband. For example, the transmitting device may modulate S(0)~S(m1−1) and A1(0)~A1(m1−1) on the first subband. At 385, the transmitting device may modulate symbols on a second subband. For example, the transmitting device may modulate S(m1)~S(m1+m2−1) and A2(0)~A2(m2−1) on the second subband.

Although not depicted herein, it may be understood that the transmitting device may transmit, on the first subband corresponding to the first subband index, a first modulated bit stream corresponding to the first distribution matcher. Additionally or alternatively, the transmitting device may transmit, on the second subband corresponding to the second subband index, a second modulated bit stream corresponding to the second distribution matcher. Although the example depicted with reference to FIG. 3 shows two distribution matchers, it should be understood that a similar technique may be employed with more than two distribution matchers. In such examples, the transmitting device may further divide the source bits into a corresponding number of subsets (e.g., two distribution matchers involves three subsets, and three distribution matchers involves four subsets, etc.) and the transmitting device may apply corresponding parameters at the respective distribution matchers (e.g., based on a received configuration that maps distribution matcher parameters to subband indices).

Figure 4:
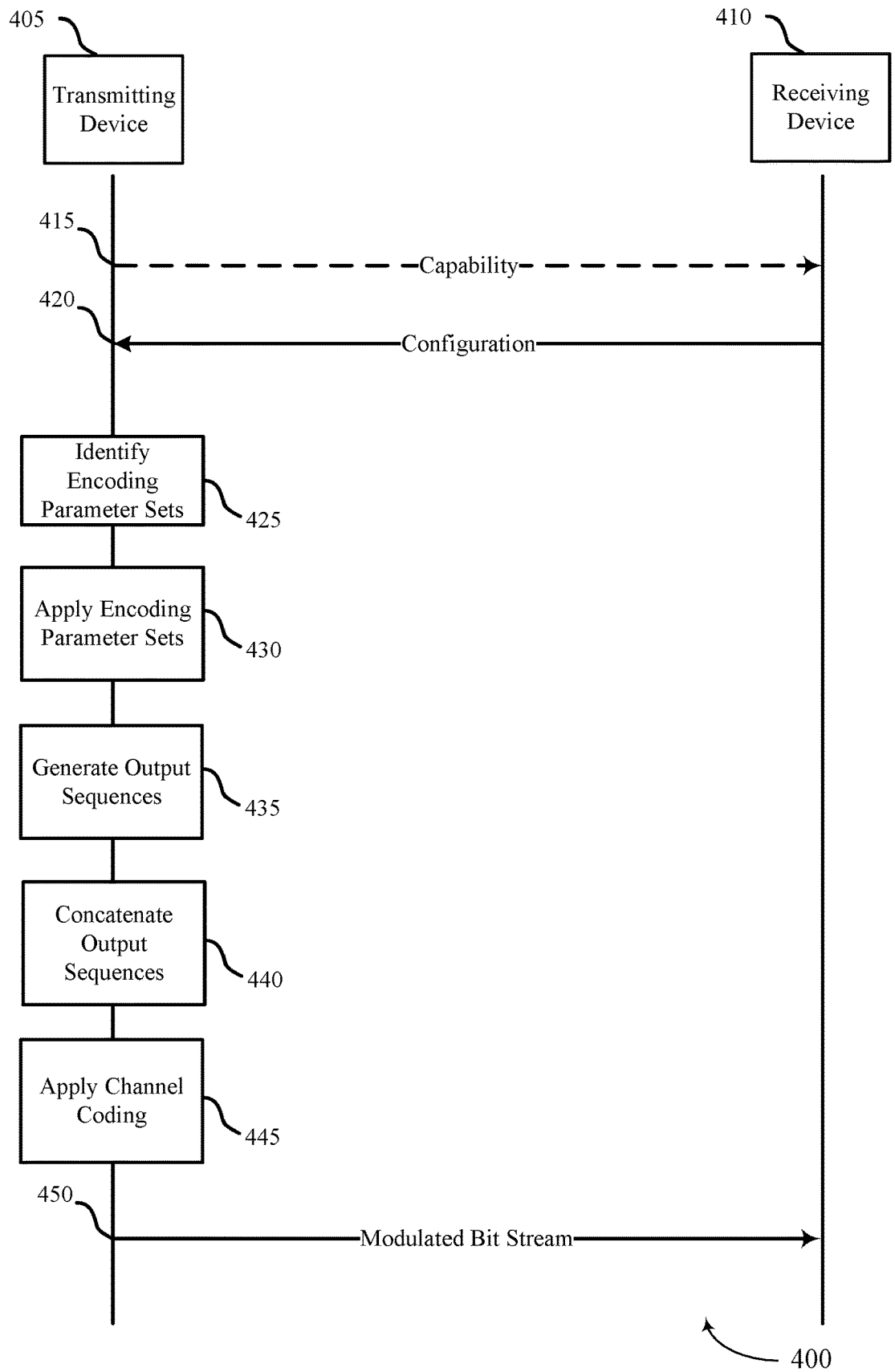
FIG. 4 illustrates an example of a process flow that supports subband level constellation shaping in accordance with aspects of the present disclosure.

FIG. 4 illustrates an example of a process flow 400 that supports subband level constellation shaping in accordance with aspects of the present disclosure. In some examples, the process flow 400 may implement aspects of wireless communications system 100 and wireless communications system 200. Process flow 400 may be implemented by a transmitting device 405 (such as a base station 105 or a UE 115) and a receiving device 410 (such as a base station 105 or a UE 115). In this example, the transmitting device 405 may act as an input node and perform encoding, while the receiving device 410 may act as an output node and perform decoding. In one example, a base station 105 may act as the input node and a UE 115 may act as the output node. In another example, a UE 115 may act as the input node while a base station 105 may act as the output node. In other examples, the communications may be between two UEs 115 or two base stations 105, or between any other quantity of nodes of the same or different types. The transmitting device may use an encoding scheme to implement subband level constellation shaping and the receiving device may use a corresponding decoding scheme.

Some devices in a wireless network may employ the use of constellation shaping as part of a signal modulation process. To reduce SNR variation, one or more aspects of the present disclosure provide a framework to modulate bit streams such that bit streams of a different subband modulates with a different modulation order. In some aspects, a transmitting device may receive a configuration indicating a mapping between subband indices and distribution matcher parameters. Upon selecting the parameters to apply for modulating a bit stream of a particular subband, the transmitting device may apply the corresponding parameters at a first distribution matcher and a second distribution matcher and transmit the modulated bit streams on a first subband and a second subband. In particular, the process flow 400 may be used to implement a signal modulation process considering the SNR of different subcarriers.

At 415, the transmitting device 405 may optionally transmit, to the receiving device 410, a capability of the transmitting device 405 to support a set of distribution matchers (e.g., two or more). At 420, the transmitting device 405 may receive a configuration indicating a mapping between a set of subband indices and a set of encoding parameter sets. For example, the receiving device 410 may transmit the configuration to the transmitting device 405. In some cases, the configuration indicating the mapping between the set of subband indices and the set of encoding parameter sets may be based on the transmitted capability.

Although not depicted in the example of FIG. 4, it may be understood that instead of transmitting the capability, the transmitting device 405 may identify a capability of the transmitting device 405 to support a subset of the set of encoding parameter sets. The transmitting device 405 may then select the subset of the set of encoding parameter sets from the set of encoding parameter sets based on the received configuration.

At 425, the transmitting device 405 may identify a first encoding parameter set and a second encoding parameter set. For instance, the transmitting device 405 may determine that a first subset of a bit stream is associated with a first subband index and a second subset of the bit stream is associated with a second subband index. The transmitting device 405 may identify the first encoding parameter set based on the mapping between the first subband index and the first encoding parameter set and may identify the second encoding parameter set based on the mapping between the second subband index and the second encoding parameter set.

At 430, the transmitting device 405 may apply, at a first distribution matcher, the first encoding parameter set of the set of encoding parameter sets to the first subset of the bit stream. Additionally, the transmitting device 405 may apply, at a second distribution matcher, the second encoding parameter set of the set of encoding parameter sets to the second subset of the bit stream. In some cases, the first encoding parameter set may be associated with the first subband index and the second encoding parameter set may be associated with the second subband index. In some examples, prior to applying the encoding parameter sets, the transmitting device 405 may identify the first subset of the bit stream.

At 435, the transmitting device 405 may generate output sequences. For instance, the transmitting device 405 may generate a first output sequence based on applying the first encoding parameter set at the first distribution matcher. Additionally, the transmitting device 405 may generate a second output sequence based on applying the second encoding parameter set at the second distribution matcher.

At 440, the transmitting device 405 may concatenate the first output sequence and the second output sequence to generate a concatenated sequence. At 445, the transmitting device 405 may apply channel coding to the concatenated sequence based on a code rate parameter. In some examples, the code rate parameter may be included in the first encoding parameter set and the second encoding parameter set. In some examples, a common code rate parameter may be associated with the first encoding parameter set and the second encoding parameter set.

At 450, the transmitting device 405 may transmit one or more modulated bit streams. For instance, the transmitting device 405 may transmit, on a first subband corresponding to the first subband index, a first modulated bit stream corresponding to the first distribution matcher. The transmitting device 405 may additionally transmit, on a second subband corresponding to the second subband index, a second modulated bit stream corresponding to the second distribution matcher.

Figure 5:
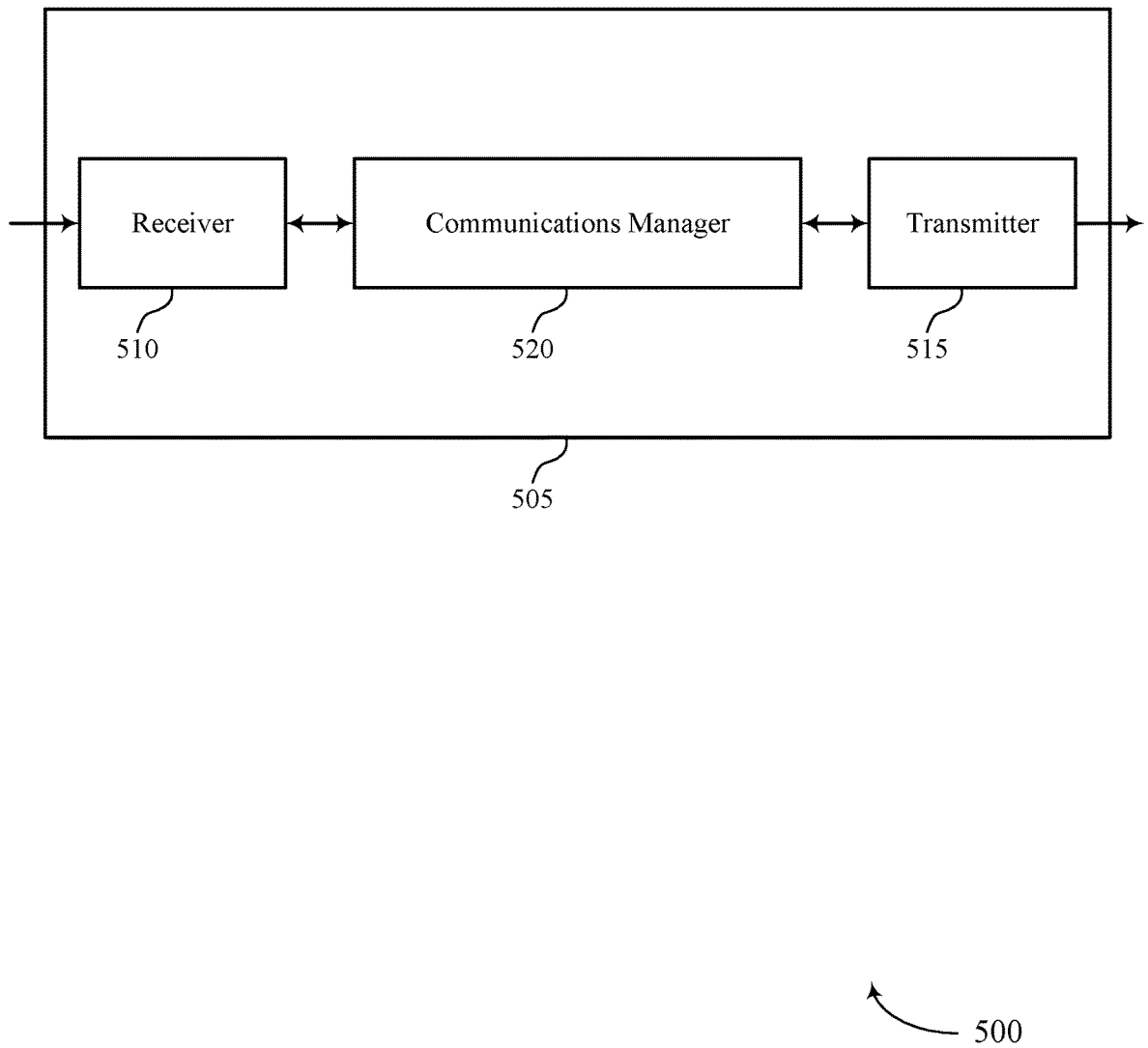
FIGS. 5 and 6 show block diagrams of devices that support subband level constellation shaping in accordance with aspects of the present disclosure.

FIG. 5 shows a block diagram 500 of a device 505 that supports subband level constellation shaping in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to subband level constellation shaping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to subband level constellation shaping). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of subband level constellation shaping as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a configuration indicating a mapping between a set of multiple subband indices and a set of multiple encoding parameter sets. The communications manager 520 may be configured as or otherwise support a means for applying, at a first distribution matcher, a first encoding parameter set of the set of multiple encoding parameter sets to a first subset of a bit stream, where the first encoding parameter set is associated with a first subband index. The communications manager 520 may be configured as or otherwise support a means for applying, at a second distribution matcher, a second encoding parameter set of the set of multiple encoding parameter sets to a second subset of the bit stream, where the second encoding parameter set is associated with a second subband index. The communications manager 520 may be configured as or otherwise support a means for transmitting, on a first subband corresponding to the first subband index, a first modulated bit stream corresponding to the first distribution matcher. The communications manager 520 may be configured as or otherwise support a means for transmitting, on a second subband corresponding to the second subband index, a second modulated bit stream corresponding to the second distribution matcher.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources.

Figure 6:
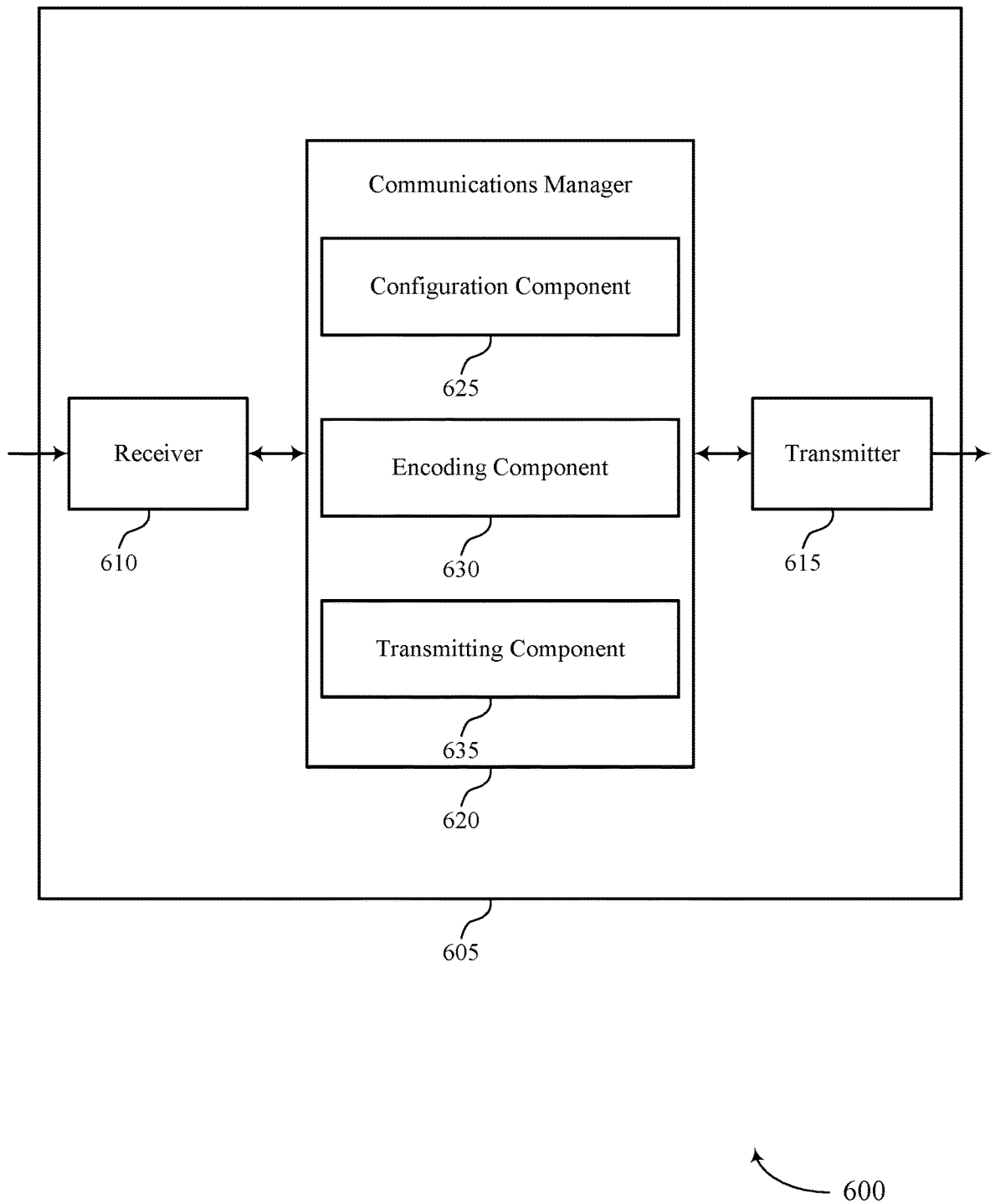

FIG. 6 shows a block diagram 600 of a device 605 that supports subband level constellation shaping in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to subband level constellation shaping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to subband level constellation shaping). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of subband level constellation shaping as described herein. For example, the communications manager 620 may include a configuration component 625, an encoding component 630, a transmitting component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving, from a base station, a configuration indicating a mapping between a set of multiple subband indices and a set of multiple encoding parameter sets. The encoding component 630 may be configured as or otherwise support a means for applying, at a first distribution matcher, a first encoding parameter set of the set of multiple encoding parameter sets to a first subset of a bit stream, where the first encoding parameter set is associated with a first subband index. The encoding component 630 may be configured as or otherwise support a means for applying, at a second distribution matcher, a second encoding parameter set of the set of multiple encoding parameter sets to a second subset of the bit stream, where the second encoding parameter set is associated with a second subband index. The transmitting component 635 may be configured as or otherwise support a means for transmitting, on a first subband corresponding to the first subband index, a first modulated bit stream corresponding to the first distribution matcher. The transmitting component 635 may be configured as or otherwise support a means for transmitting, on a second subband corresponding to the second subband index, a second modulated bit stream corresponding to the second distribution matcher.

Figure 7:
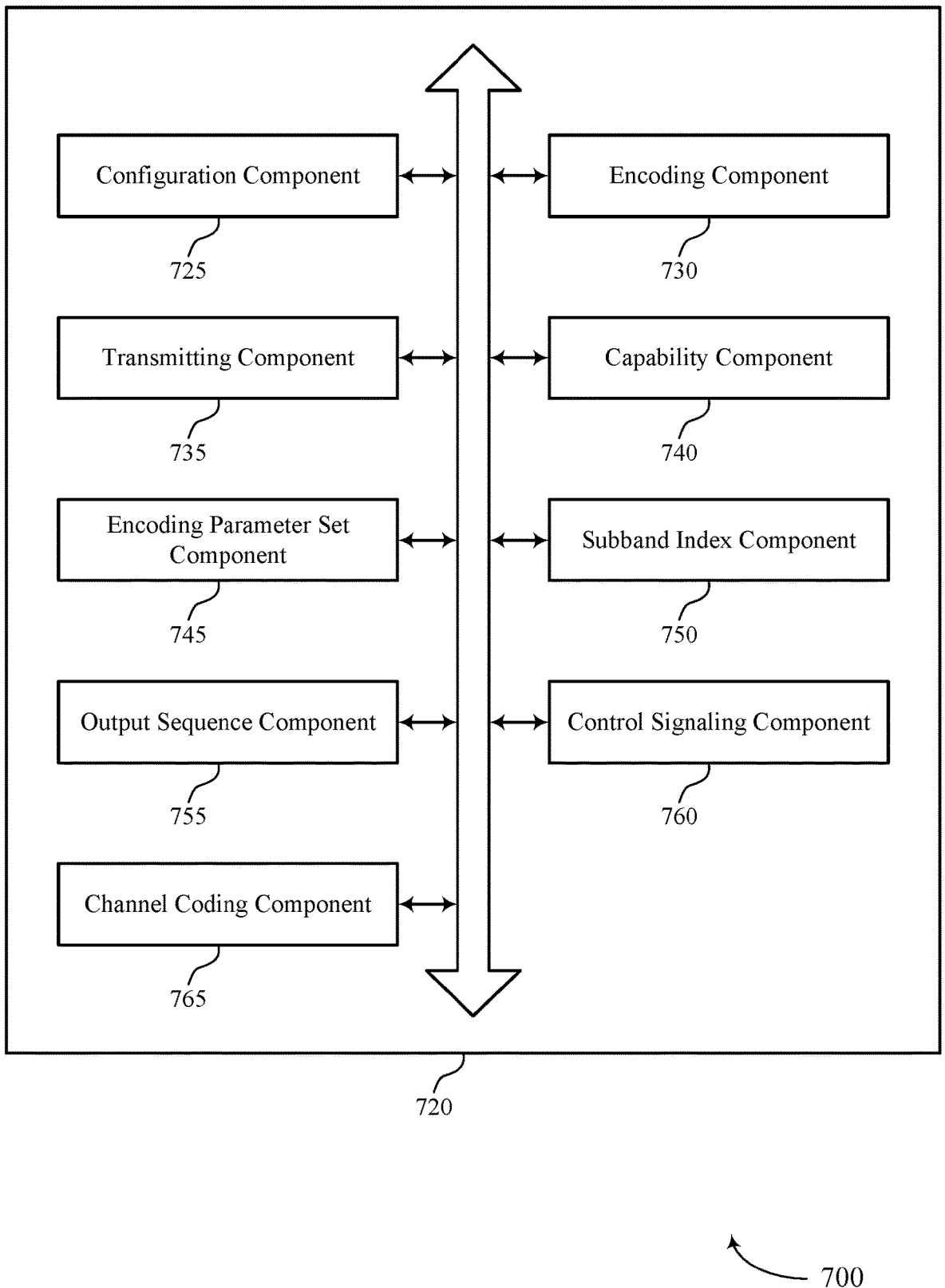
FIG. 7 shows a block diagram of a communications manager that supports subband level constellation shaping in accordance with aspects of the present disclosure.

FIG. 7 shows a block diagram 700 of a communications manager 720 that supports subband level constellation shaping in accordance with aspects of the present disclosure. The communications manager 720 may be an example of aspects of a communications manager 520, a communications manager 620, or both, as described herein. The communications manager 720, or various components thereof, may be an example of means for performing various aspects of subband level constellation shaping as described herein. For example, the communications manager 720 may include a configuration component 725, an encoding component 730, a transmitting component 735, a capability component 740, an encoding parameter set component 745, a subband index component 750, an output sequence component 755, a control signaling component 760, a channel coding component 765, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving, from a base station, a configuration indicating a mapping between a set of multiple subband indices and a set of multiple encoding parameter sets. The encoding component 730 may be configured as or otherwise support a means for applying, at a first distribution matcher, a first encoding parameter set of the set of multiple encoding parameter sets to a first subset of a bit stream, where the first encoding parameter set is associated with a first subband index.

In some examples, the encoding component 730 may be configured as or otherwise support a means for applying, at a second distribution matcher, a second encoding parameter set of the set of multiple encoding parameter sets to a second subset of the bit stream, where the second encoding parameter set is associated with a second subband index. The transmitting component 735 may be configured as or otherwise support a means for transmitting, on a first subband corresponding to the first subband index, a first modulated bit stream corresponding to the first distribution matcher. In some examples, the transmitting component 735 may be configured as or otherwise support a means for transmitting, on a second subband corresponding to the second subband index, a second modulated bit stream corresponding to the second distribution matcher.

In some examples, the capability component 740 may be configured as or otherwise support a means for transmitting, to the base station, a capability of the UE to support a set of multiple distribution matchers, where the configuration indicating the mapping between the set of multiple subband indices and the set of multiple encoding parameter sets is based on the transmitted capability.

In some examples, the capability component 740 may be configured as or otherwise support a means for identifying a capability of the UE to support a subset of the set of multiple encoding parameter sets. In some examples, the encoding parameter set component 745 may be configured as or otherwise support a means for selecting the subset of the set of multiple encoding parameter sets from the set of multiple encoding parameter sets based on the received configuration, where the subset of the set of multiple encoding parameter sets includes the first encoding parameter set and the second encoding parameter set.

In some examples, the subband index component 750 may be configured as or otherwise support a means for determining that the first subset of the bit stream is associated with the first subband index and the second subset of the bit stream is associated with the second subband index. In some examples, the encoding parameter set component 745 may be configured as or otherwise support a means for identifying the first encoding parameter set based on the mapping between the first subband index and the first encoding parameter set. In some examples, the encoding parameter set component 745 may be configured as or otherwise support a means for identifying the second encoding parameter set based on the mapping between the second subband index and the second encoding parameter set.

In some examples, to support identifying the first encoding parameter set, the encoding parameter set component 745 may be configured as or otherwise support a means for identifying a modulation order and a distribution matcher parameter associated with the first distribution matcher, where applying the first encoding parameter set includes applying the modulation order and the distribution matcher parameter at the first distribution matcher.

In some examples, to support identifying the second encoding parameter set, the encoding parameter set component 745 may be configured as or otherwise support a means for identifying a modulation order and a distribution matcher parameter associated with the second distribution matcher, where applying the second encoding parameter set includes applying the modulation order and the distribution matcher parameter at the second distribution matcher.

In some examples, the first encoding parameter set includes a first distribution matcher distribution value and the second encoding parameter set includes a second distribution matcher distribution value. In some examples, the output sequence component 755 may be configured as or otherwise support a means for generating a first output sequence based on applying the first encoding parameter set at the first distribution matcher. In some examples, the output sequence component 755 may be configured as or otherwise support a means for generating a second output sequence based on applying the second encoding parameter set at the second distribution matcher.

In some examples, the output sequence component 755 may be configured as or otherwise support a means for concatenating the first output sequence and the second output sequence to generate a concatenated sequence. In some examples, the channel coding component 765 may be configured as or otherwise support a means for applying channel coding to the concatenated sequence based on a code rate parameter.

In some examples, the code rate parameter is included in the first encoding parameter set and the second encoding parameter set. In some examples, a common code rate parameter is associated with the first encoding parameter set and the second encoding parameter set.

In some examples, the control signaling component 760 may be configured as or otherwise support a means for receiving, from the base station, a control signaling including the configuration indicating the mapping between the set of multiple subband indices and the set of multiple encoding parameter sets.

In some examples, the control signaling includes at least one of a downlink control information and a radio resource control signaling. In some examples, the first subband index and the second subband index are associated with at least one of different subcarriers and different subband channels.

Figure 8:
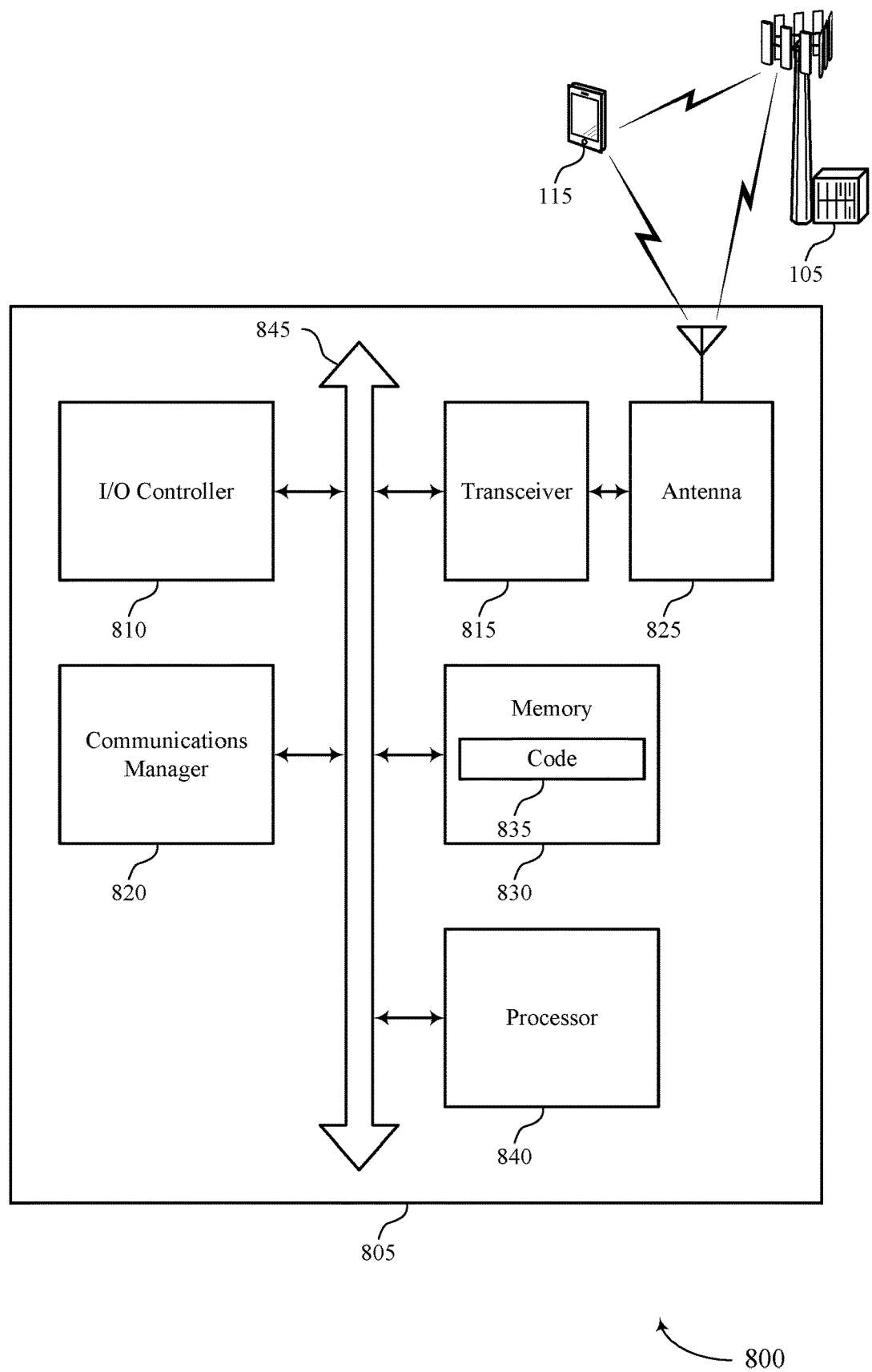
FIG. 8 shows a diagram of a system including a device that supports subband level constellation shaping in accordance with aspects of the present disclosure.

FIG. 8 shows a diagram of a system 800 including a device 805 that supports subband level constellation shaping in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting subband level constellation shaping). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a configuration indicating a mapping between a set of multiple subband indices and a set of multiple encoding parameter sets. The communications manager 820 may be configured as or otherwise support a means for applying, at a first distribution matcher, a first encoding parameter set of the set of multiple encoding parameter sets to a first subset of a bit stream, where the first encoding parameter set is associated with a first subband index. The communications manager 820 may be configured as or otherwise support a means for applying, at a second distribution matcher, a second encoding parameter set of the set of multiple encoding parameter sets to a second subset of the bit stream, where the second encoding parameter set is associated with a second subband index. The communications manager 820 may be configured as or otherwise support a means for transmitting, on a first subband corresponding to the first subband index, a first modulated bit stream corresponding to the first distribution matcher. The communications manager 820 may be configured as or otherwise support a means for transmitting, on a second subband corresponding to the second subband index, a second modulated bit stream corresponding to the second distribution matcher.

By including or configuring the communications manager 820 in accordance with examples as described herein, the device 805 may support techniques for modulating bit streams such that bit streams of a different subband modulates with a different modulation order. The device 805 may implement subband level constellation shaping for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of subband level constellation shaping as described herein, or the processor 840 and the memory 830 may be otherwise configured to perform or support such operations.

Figure 9:
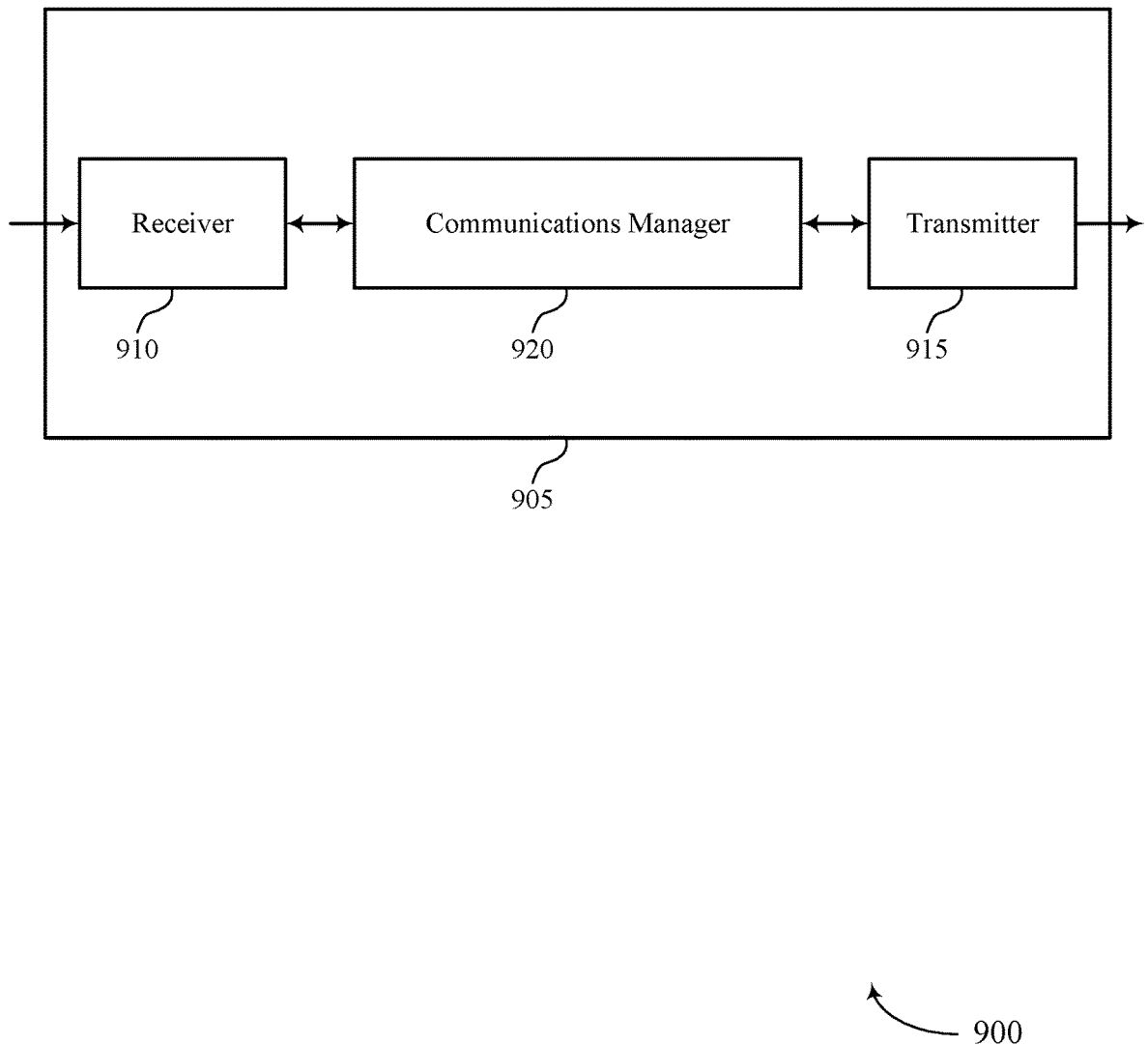
FIGS. 9 and 10 show block diagrams of devices that support subband level constellation shaping in accordance with aspects of the present disclosure.

FIG. 9 shows a block diagram 900 of a device 905 that supports subband level constellation shaping in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to subband level constellation shaping). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to subband level constellation shaping). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of subband level constellation shaping as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for identifying a configuration indicating a mapping between a set of multiple subband indices and a set of multiple encoding parameter sets. The communications manager 920 may be configured as or otherwise support a means for applying, at a first distribution matcher, a first encoding parameter set of the set of multiple encoding parameter sets to a first subset of a bit stream, where the first encoding parameter set is associated with a first subband index. The communications manager 920 may be configured as or otherwise support a means for applying, at a second distribution matcher, a second encoding parameter set of the set of multiple encoding parameter sets to a second subset of the bit stream, where the second encoding parameter set is associated with a second subband index. The communications manager 920 may be configured as or otherwise support a means for transmitting, on a first subband corresponding to the first subband index, a first modulated bit stream corresponding to the first distribution matcher. The communications manager 920 may be configured as or otherwise support a means for transmitting, on a second subband corresponding to the second subband index, a second modulated bit stream corresponding to the second distribution matcher.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for subband level constellation shaping for reduced processing, reduced power consumption, more efficient utilization of communication resources.

Figure 10:
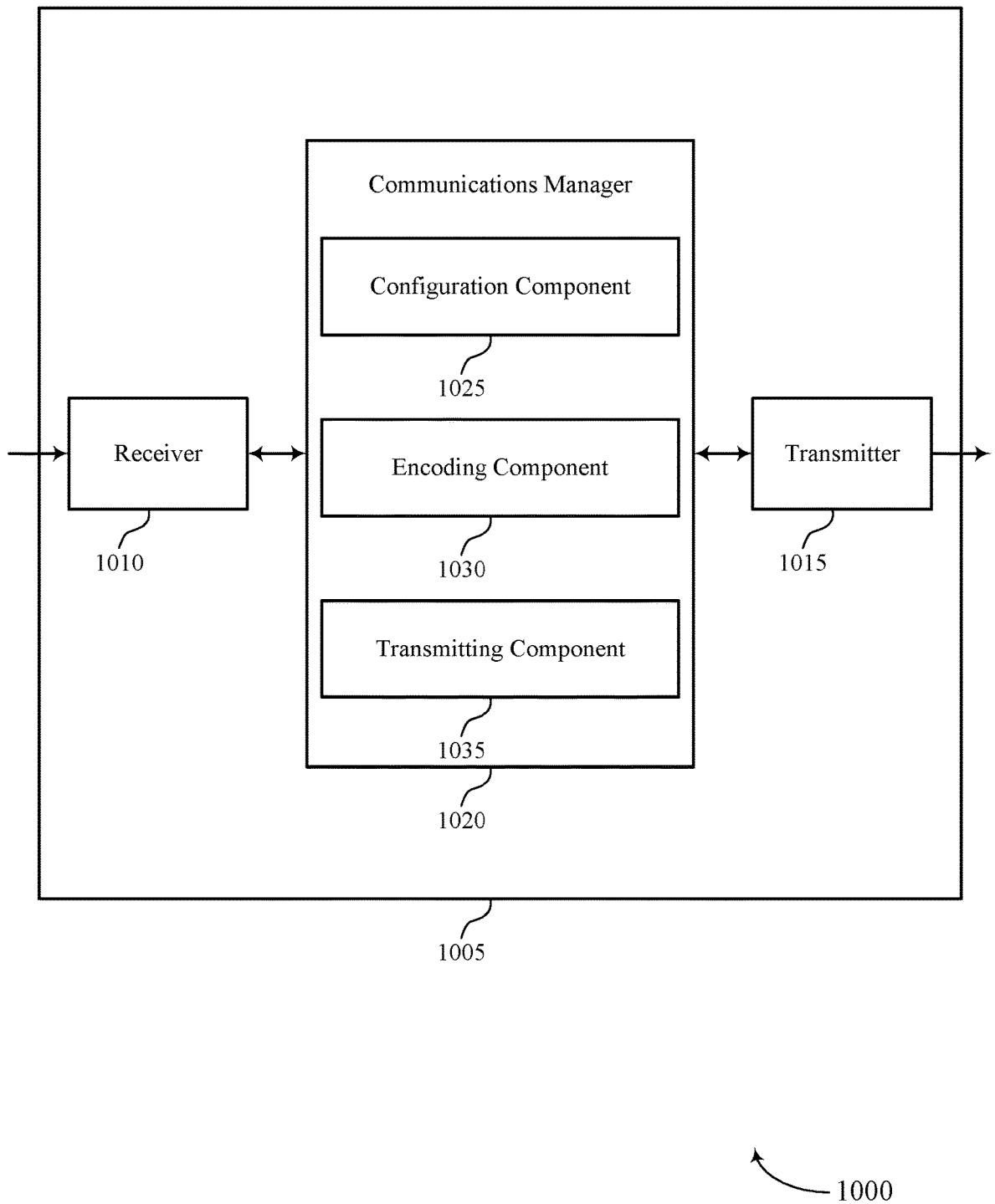

FIG. 10 shows a block diagram 1000 of a device 1005 that supports subband level constellation shaping in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to subband level constellation shaping). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to subband level constellation shaping). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of subband level constellation shaping as described herein. For example, the communications manager 1020 may include a configuration component 1025, an encoding component 1030, a transmitting component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration component 1025 may be configured as or otherwise support a means for identifying a configuration indicating a mapping between a set of multiple subband indices and a set of multiple encoding parameter sets. The encoding component 1030 may be configured as or otherwise support a means for applying, at a first distribution matcher, a first encoding parameter set of the set of multiple encoding parameter sets to a first subset of a bit stream, where the first encoding parameter set is associated with a first subband index. The encoding component 1030 may be configured as or otherwise support a means for applying, at a second distribution matcher, a second encoding parameter set of the set of multiple encoding parameter sets to a second subset of the bit stream, where the second encoding parameter set is associated with a second subband index. The transmitting component 1035 may be configured as or otherwise support a means for transmitting, on a first subband corresponding to the first subband index, a first modulated bit stream corresponding to the first distribution matcher. The transmitting component 1035 may be configured as or otherwise support a means for transmitting, on a second subband corresponding to the second subband index, a second modulated bit stream corresponding to the second distribution matcher.

Figure 11:
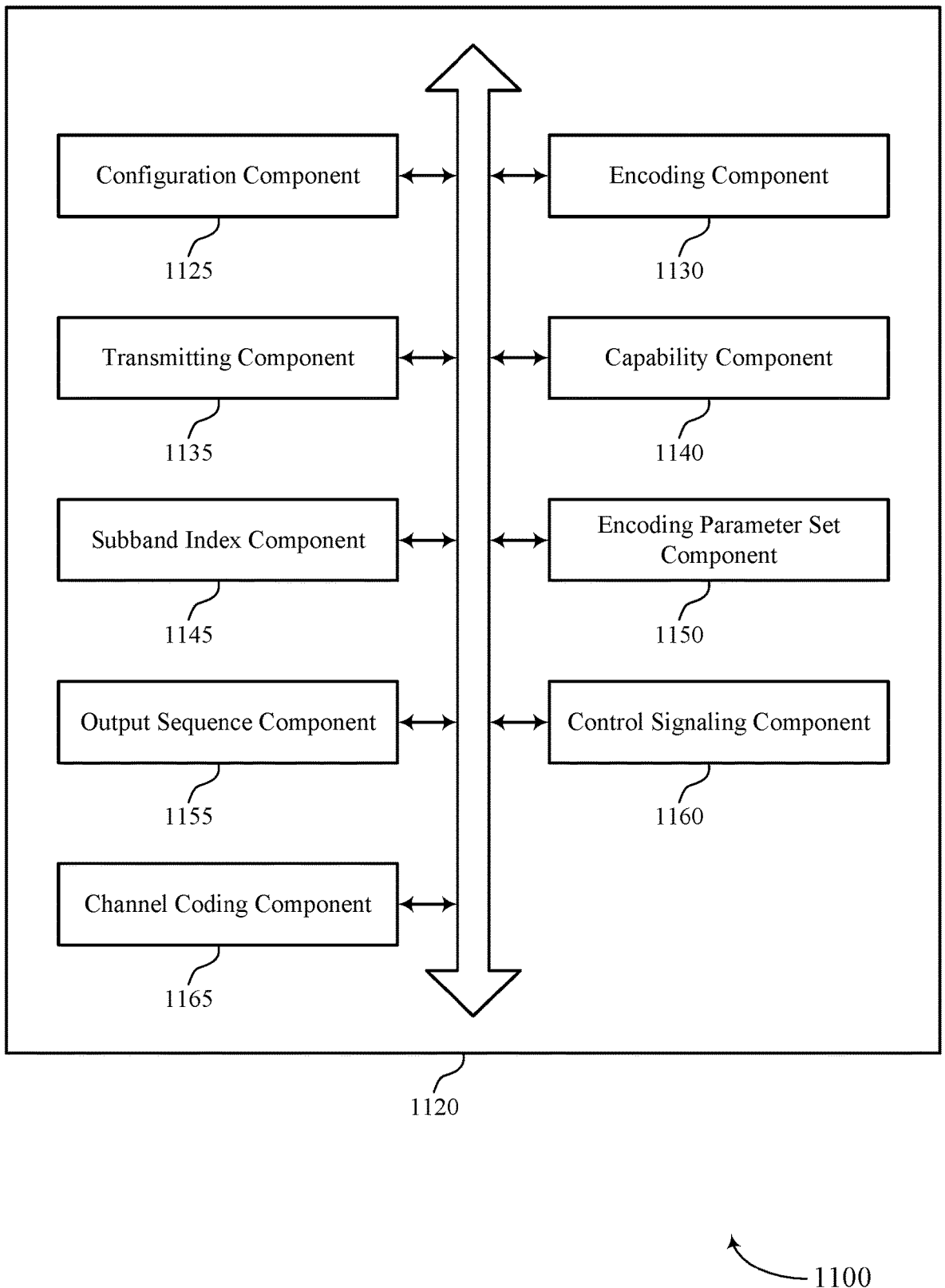
FIG. 11 shows a block diagram of a communications manager that supports subband level constellation shaping in accordance with aspects of the present disclosure.

FIG. 11 shows a block diagram 1100 of a communications manager 1120 that supports subband level constellation shaping in accordance with aspects of the present disclosure. The communications manager 1120 may be an example of aspects of a communications manager 920, a communications manager 1020, or both, as described herein. The communications manager 1120, or various components thereof, may be an example of means for performing various aspects of subband level constellation shaping as described herein. For example, the communications manager 1120 may include a configuration component 1125, an encoding component 1130, a transmitting component 1135, a capability component 1140, a subband index component 1145, an encoding parameter set component 1150, an output sequence component 1155, a control signaling component 1160, a channel coding component 1165, or any combination thereof. Each of these components may communicate, directly or indirectly, with one another (e.g., via one or more buses).

The communications manager 1120 may support wireless communication at a base station in accordance with examples as disclosed herein. The configuration component 1125 may be configured as or otherwise support a means for identifying a configuration indicating a mapping between a set of multiple subband indices and a set of multiple encoding parameter sets. The encoding component 1130 may be configured as or otherwise support a means for applying, at a first distribution matcher, a first encoding parameter set of the set of multiple encoding parameter sets to a first subset of a bit stream, where the first encoding parameter set is associated with a first subband index. In some examples, the encoding component 1130 may be configured as or otherwise support a means for applying, at a second distribution matcher, a second encoding parameter set of the set of multiple encoding parameter sets to a second subset of the bit stream, where the second encoding parameter set is associated with a second subband index. The transmitting component 1135 may be configured as or otherwise support a means for transmitting, on a first subband corresponding to the first subband index, a first modulated bit stream corresponding to the first distribution matcher. In some examples, the transmitting component 1135 may be configured as or otherwise support a means for transmitting, on a second subband corresponding to the second subband index, a second modulated bit stream corresponding to the second distribution matcher.

In some examples, the capability component 1140 may be configured as or otherwise support a means for receiving, from a UE, a capability of the UE to support a set of multiple distribution matchers. In some examples, the configuration component 1125 may be configured as or otherwise support a means for transmitting, to the UE, the configuration indicating the mapping between the set of multiple subband indices and the set of multiple encoding parameter sets, where the configuration is identified based on the received capability.

In some examples, the subband index component 1145 may be configured as or otherwise support a means for determining that the first subset of the bit stream is associated with the first subband index and the second subset of the bit stream is associated with the second subband index. In some examples, the encoding parameter set component 1150 may be configured as or otherwise support a means for identifying the first encoding parameter set based on the mapping between the first subband index and the first encoding parameter set. In some examples, the encoding parameter set component 1150 may be configured as or otherwise support a means for identifying the second encoding parameter set based on the mapping between the second subband index and the second encoding parameter set.

In some examples, to support identifying the first encoding parameter set, the encoding parameter set component 1150 may be configured as or otherwise support a means for identifying a modulation order and a distribution matcher parameter associated with the first distribution matcher, where applying the first encoding parameter set includes applying the modulation order and the distribution matcher parameter at the first distribution matcher.

In some examples, to support identifying the second encoding parameter set, the encoding parameter set component 1150 may be configured as or otherwise support a means for identifying a modulation order and a distribution matcher parameter associated with the second distribution matcher, where applying the second encoding parameter set includes applying the modulation order and the distribution matcher parameter at the second distribution matcher.

In some examples, the first encoding parameter set includes a first distribution matcher distribution value and the second encoding parameter set includes a second distribution matcher distribution value. In some examples, the output sequence component 1155 may be configured as or otherwise support a means for generating a first output sequence based on applying the first encoding parameter set at the first distribution matcher. In some examples, the output sequence component 1155 may be configured as or otherwise support a means for generating a second output sequence based on applying the second encoding parameter set at the second distribution matcher.

In some examples, the output sequence component 1155 may be configured as or otherwise support a means for concatenating the first output sequence and the second output sequence to generate a concatenated sequence. In some examples, the channel coding component 1165 may be configured as or otherwise support a means for applying channel coding to the concatenated sequence based on a code rate parameter.

In some examples, the code rate parameter is included in the first encoding parameter set and the second encoding parameter set. In some examples, a common code rate parameter is associated with the first encoding parameter set and the second encoding parameter set.

In some examples, the control signaling component 1160 may be configured as or otherwise support a means for transmitting, to a UE, a control signaling including the configuration indicating the mapping between the set of multiple subband indices and the set of multiple encoding parameter sets.

In some examples, the control signaling includes at least one of a downlink control information and a radio resource control signaling. In some examples, the first subband index and the second subband index are associated with at least one of different subcarriers and different subband channels.

Figure 12:
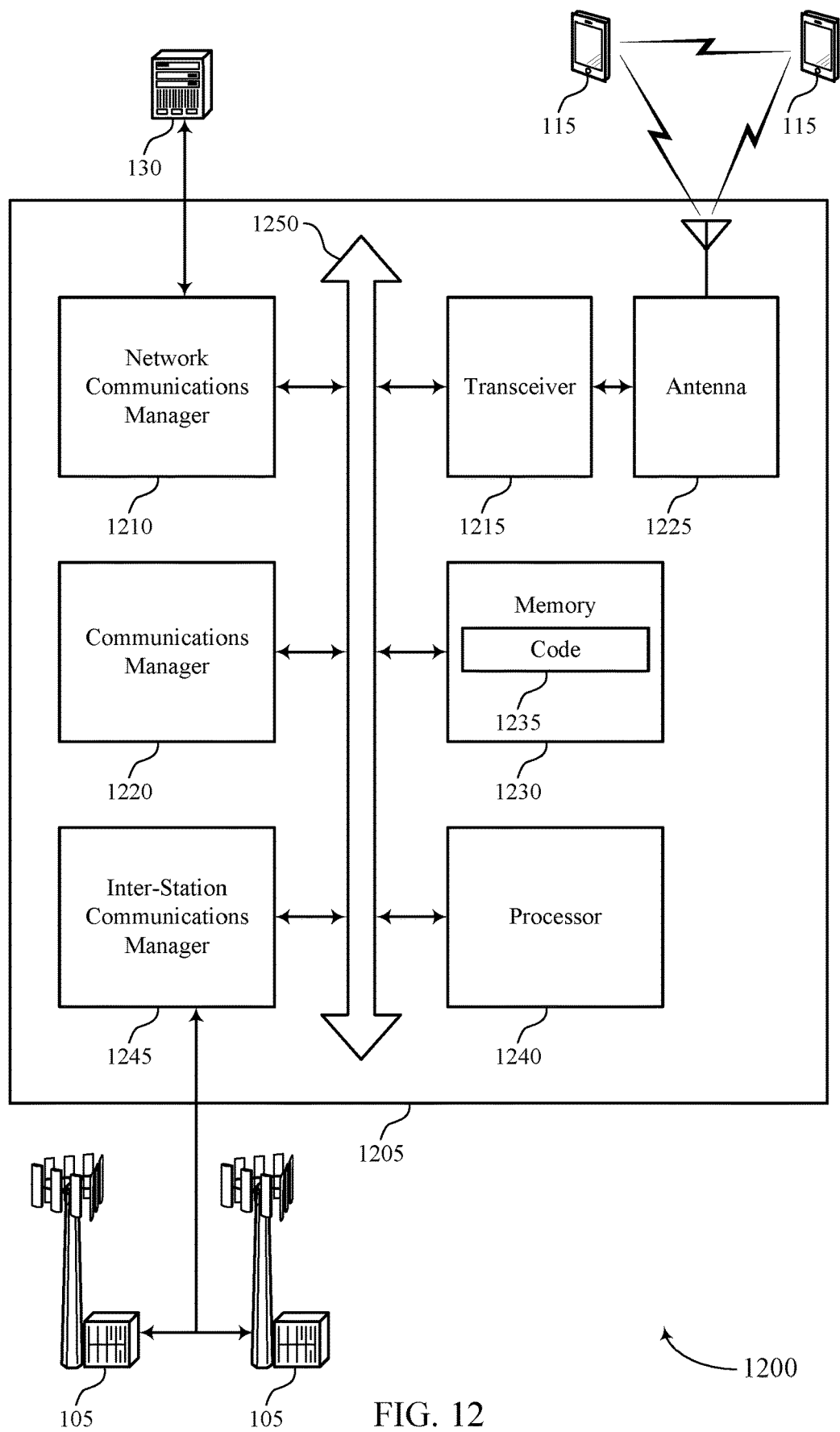
FIG. 12 shows a diagram of a system including a device that supports subband level constellation shaping in accordance with aspects of the present disclosure.

FIG. 12 shows a diagram of a system 1200 including a device 1205 that supports subband level constellation shaping in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting subband level constellation shaping). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for identifying a configuration indicating a mapping between a set of multiple subband indices and a set of multiple encoding parameter sets. The communications manager 1220 may be configured as or otherwise support a means for applying, at a first distribution matcher, a first encoding parameter set of the set of multiple encoding parameter sets to a first subset of a bit stream, where the first encoding parameter set is associated with a first subband index. The communications manager 1220 may be configured as or otherwise support a means for applying, at a second distribution matcher, a second encoding parameter set of the set of multiple encoding parameter sets to a second subset of the bit stream, where the second encoding parameter set is associated with a second subband index. The communications manager 1220 may be configured as or otherwise support a means for transmitting, on a first subband corresponding to the first subband index, a first modulated bit stream corresponding to the first distribution matcher. The communications manager 1220 may be configured as or otherwise support a means for transmitting, on a second subband corresponding to the second subband index, a second modulated bit stream corresponding to the second distribution matcher.

By including or configuring the communications manager 1220 in accordance with examples as described herein, the device 1205 may support techniques for subband level constellation shaping resulting in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of subband level constellation shaping as described herein, or the processor 1240 and the memory 1230 may be otherwise configured to perform or support such operations.

Figure 13:
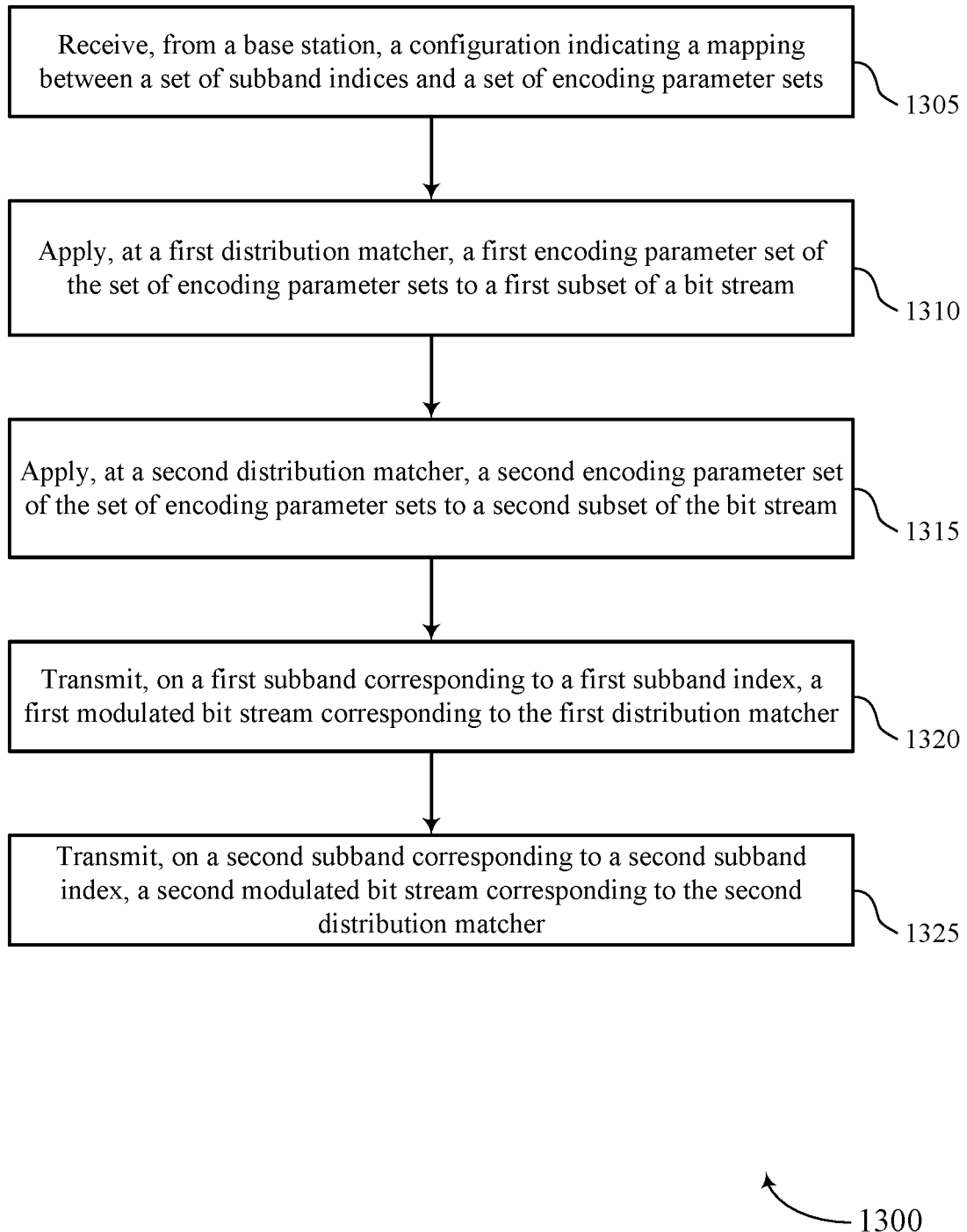
FIGS. 13 through 16 show flowcharts illustrating methods that support subband level constellation shaping in accordance with aspects of the present disclosure.

FIG. 13 shows a flowchart illustrating a method 1300 that supports subband level constellation shaping in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a configuration indicating a mapping between a set of multiple subband indices and a set of multiple encoding parameter sets. The operations of 1305 may be performed in accordance with examples as disclosed herein. In some examples, aspects of the operations of 1305 may be performed by a configuration component 725 as described with reference to FIG. 7.

At 1310, the method may include applying, at a first distribution matcher, a first encoding parameter set of the set of multiple encoding parameter sets to a first subset of a bit stream. In some cases, the first encoding parameter set may be associated with a first subband index. The operations of 1310 may be performed in accordance with examples as disclosed herein. In some examples, aspects of the operations of 1310 may be performed by an encoding component 730 as described with reference to FIG. 7.

At 1315, the method may include applying, at a second distribution matcher, a second encoding parameter set of the set of multiple encoding parameter sets to a second subset of the bit stream. In some cases, the second encoding parameter set may be associated with a second subband index. The operations of 1315 may be performed in accordance with examples as disclosed herein. In some examples, aspects of the operations of 1315 may be performed by an encoding component 730 as described with reference to FIG. 7.

At 1320, the method may include transmitting, on a first subband corresponding to the first subband index, a first modulated bit stream corresponding to the first distribution matcher. The operations of 1320 may be performed in accordance with examples as disclosed herein. In some examples, aspects of the operations of 1320 may be performed by a transmitting component 735 as described with reference to FIG. 7.

At 1325, the method may include transmitting, on a second subband corresponding to the second subband index, a second modulated bit stream corresponding to the second distribution matcher. The operations of 1325 may be performed in accordance with examples as disclosed herein. In some examples, aspects of the operations of 1325 may be performed by a transmitting component 735 as described with reference to FIG. 7.

Figure 14:
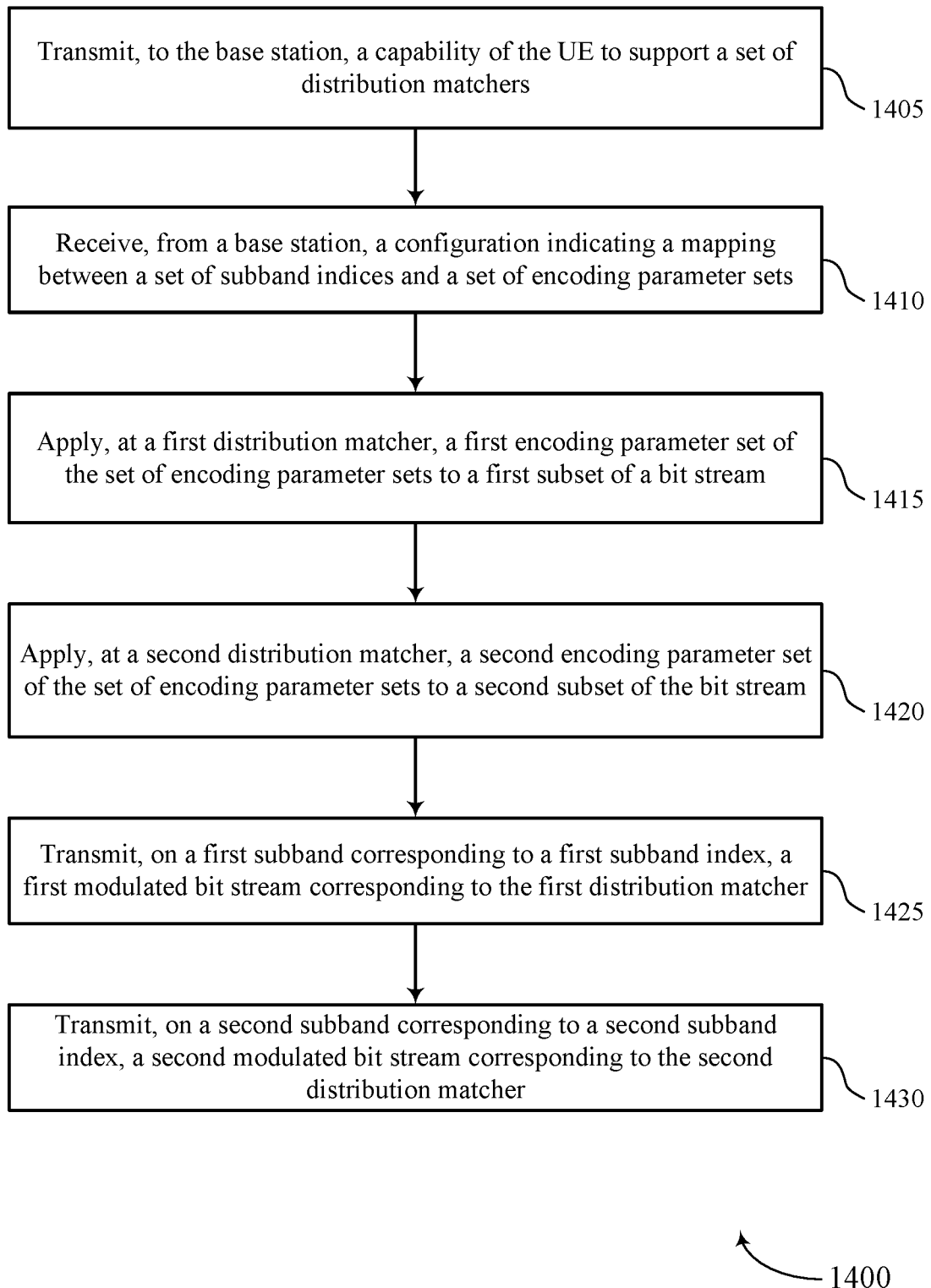

FIG. 14 shows a flowchart illustrating a method 1400 that supports subband level constellation shaping in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to the base station, a capability of the UE to support a set of distribution matchers. The operations of 1405 may be performed in accordance with examples as disclosed herein. In some examples, aspects of the operations of 1405 may be performed by a capability component 740 as described with reference to FIG. 7.

At 1410, the method may include receiving, from a base station, a configuration indicating a mapping between a set of subband indices and a set of encoding parameter sets. In some cases, the configuration indicating the mapping between the set of subband indices and the set of encoding parameter sets is based on the transmitted capability. The operations of 1410 may be performed in accordance with examples as disclosed herein. In some examples, aspects of the operations of 1410 may be performed by a configuration component 725 as described with reference to FIG. 7.

At 1415, the method may include applying, at a first distribution matcher, a first encoding parameter set of the set of encoding parameter sets to a first subset of a bit stream, where the first encoding parameter set is associated with a first subband index. The operations of 1415 may be performed in accordance with examples as disclosed herein. In some examples, aspects of the operations of 1415 may be performed by an encoding component 730 as described with reference to FIG. 7.

At 1420, the method may include applying, at a second distribution matcher, a second encoding parameter set of the set of encoding parameter sets to a second subset of the bit stream, where the second encoding parameter set is associated with a second subband index. The operations of 1420 may be performed in accordance with examples as disclosed herein. In some examples, aspects of the operations of 1420 may be performed by the encoding component 730 as described with reference to FIG. 7.

At 1425, the method may include transmitting, on a first subband corresponding to the first subband index, a first modulated bit stream corresponding to the first distribution matcher. The operations of 1425 may be performed in accordance with examples as disclosed herein. In some examples, aspects of the operations of 1425 may be performed by a transmitting component 735 as described with reference to FIG. 7.

At 1430, the method may include transmitting, on a second subband corresponding to the second subband index, a second modulated bit stream corresponding to the second distribution matcher. The operations of 1430 may be performed in accordance with examples as disclosed herein. In some examples, aspects of the operations of 1430 may be performed by the transmitting component 735 as described with reference to FIG. 7.

Figure 15:
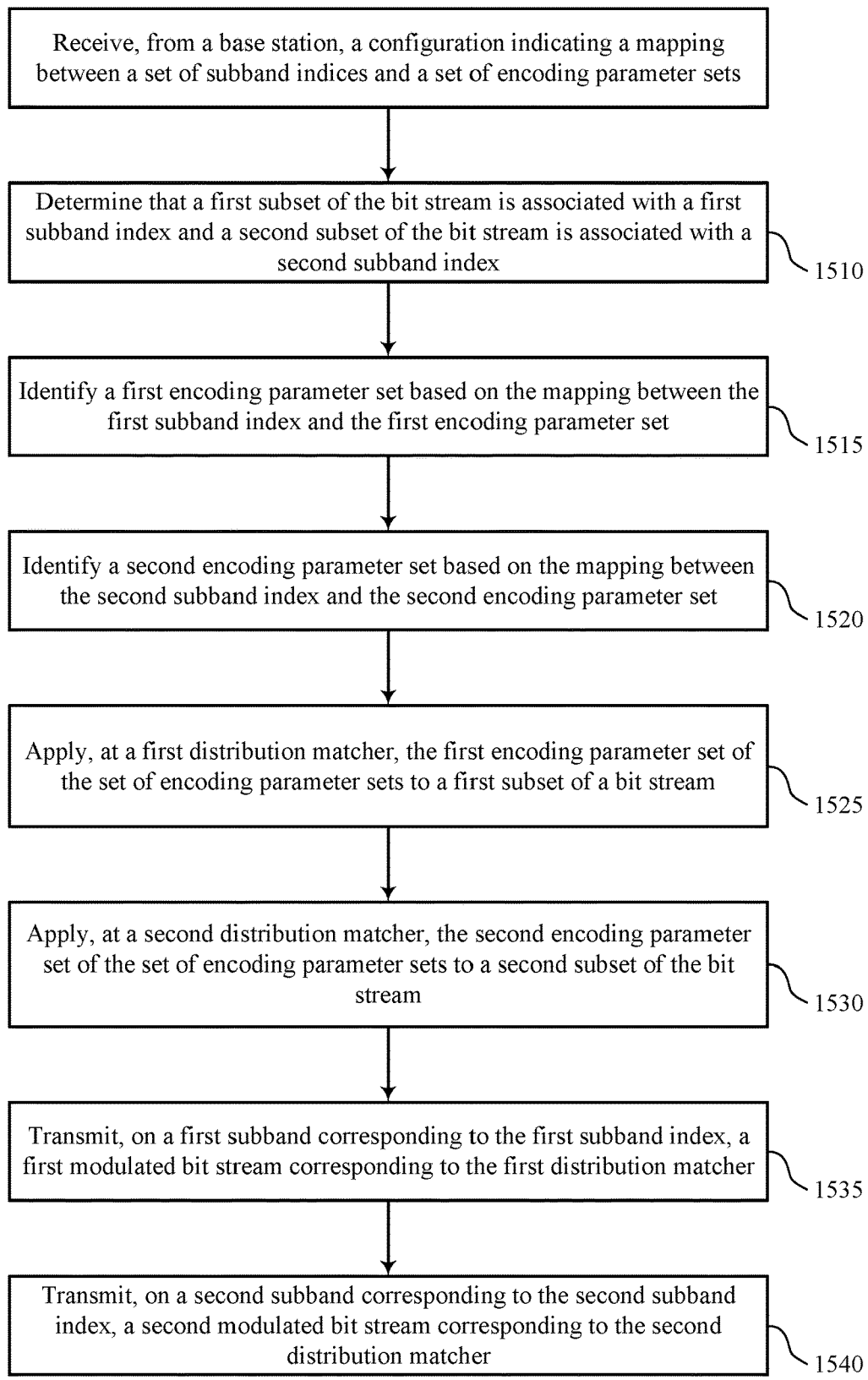

FIG. 15 shows a flowchart illustrating a method 1500 that supports subband level constellation shaping in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a configuration indicating a mapping between a set of subband indices and a set of encoding parameter sets. The operations of 1505 may be performed in accordance with examples as disclosed herein. In some examples, aspects of the operations of 1505 may be performed by a configuration component 725 as described with reference to FIG. 7.

At 1510, the method may include determining that a first subset of the bit stream is associated with a first subband index and a second subset of the bit stream is associated with a second subband index. The operations of 1510 may be performed in accordance with examples as disclosed herein. In some examples, aspects of the operations of 1510 may be performed by a subband index component 750 as described with reference to FIG. 7.

At 1515, the method may include identifying the first encoding parameter set based on the mapping between the first subband index and the first encoding parameter set. The operations of 1515 may be performed in accordance with examples as disclosed herein. In some examples, aspects of the operations of 1515 may be performed by an encoding parameter set component 745 as described with reference to FIG. 7.

At 1520, the method may include identifying the second encoding parameter set based on the mapping between the second subband index and the second encoding parameter set. The operations of 1520 may be performed in accordance with examples as disclosed herein. In some examples, aspects of the operations of 1520 may be performed by an encoding parameter set component 745 as described with reference to FIG. 7.

At 1525, the method may include applying, at a first distribution matcher, a first encoding parameter set of the set of encoding parameter sets to a first subset of a bit stream. In some cases, the first encoding parameter set is associated with a first subband index. The operations of 1525 may be performed in accordance with examples as disclosed herein. In some examples, aspects of the operations of 1525 may be performed by an encoding component 730 as described with reference to FIG. 7.

At 1530, the method may include applying, at a second distribution matcher, a second encoding parameter set of the set of encoding parameter sets to a second subset of the bit stream. In some cases, the second encoding parameter set is associated with a second subband index. The operations of 1530 may be performed in accordance with examples as disclosed herein. In some examples, aspects of the operations of 1530 may be performed by the encoding component 730 as described with reference to FIG. 7.

At 1535, the method may include transmitting, on a first subband corresponding to the first subband index, a first modulated bit stream corresponding to the first distribution matcher. The operations of 1535 may be performed in accordance with examples as disclosed herein. In some examples, aspects of the operations of 1535 may be performed by a transmitting component 735 as described with reference to FIG. 7.

At 1540, the method may include transmitting, on a second subband corresponding to the second subband index, a second modulated bit stream corresponding to the second distribution matcher. The operations of 1540 may be performed in accordance with examples as disclosed herein. In some examples, aspects of the operations of 1540 may be performed by the transmitting component 735 as described with reference to FIG. 7.

Figure 16:
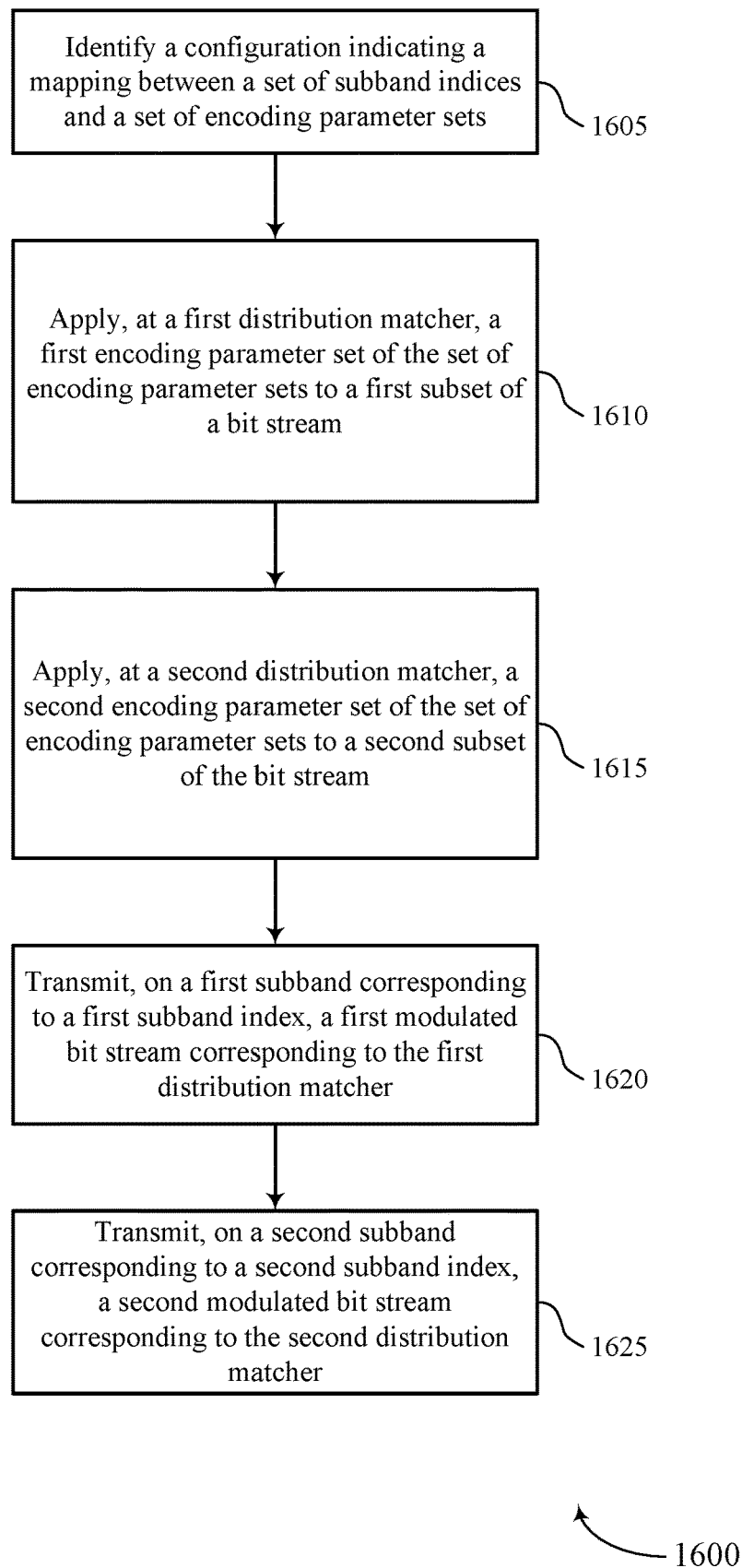

FIG. 16 shows a flowchart illustrating a method 1600 that supports subband level constellation shaping in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include identifying a configuration indicating a mapping between a set of multiple subband indices and a set of multiple encoding parameter sets. The operations of 1605 may be performed in accordance with examples as disclosed herein. In some examples, aspects of the operations of 1605 may be performed by a configuration component 1125 as described with reference to FIG. 11.

At 1610, the method may include applying, at a first distribution matcher, a first encoding parameter set of the set of multiple encoding parameter sets to a first subset of a bit stream. In some cases, the first encoding parameter set may be associated with a first subband index. The operations of 1610 may be performed in accordance with examples as disclosed herein. In some examples, aspects of the operations of 1610 may be performed by an encoding component 1130 as described with reference to FIG. 11.

At 1615, the method may include applying, at a second distribution matcher, a second encoding parameter set of the set of multiple encoding parameter sets to a second subset of the bit stream. In some cases, the second encoding parameter set may be associated with a second subband index. The operations of 1615 may be performed in accordance with examples as disclosed herein. In some examples, aspects of the operations of 1615 may be performed by an encoding component 1130 as described with reference to FIG. 11.

At 1620, the method may include transmitting, on a first subband corresponding to the first subband index, a first modulated bit stream corresponding to the first distribution matcher. The operations of 1620 may be performed in accordance with examples as disclosed herein. In some examples, aspects of the operations of 1620 may be performed by a transmitting component 1135 as described with reference to FIG. 11.

At 1625, the method may include transmitting, on a second subband corresponding to the second subband index, a second modulated bit stream corresponding to the second distribution matcher. The operations of 1625 may be performed in accordance with examples as disclosed herein. In some examples, aspects of the operations of 1625 may be performed by a transmitting component 1135 as described with reference to FIG. 11.

The following provides an overview of aspects of the present disclosure:

Aspect 1: A method for wireless communication at a UE, comprising: receiving, from a base station, a configuration indicating a mapping between a plurality of subband indices and a plurality of encoding parameter sets; applying, at a first distribution matcher, a first encoding parameter set of the plurality of encoding parameter sets to a first subset of a bit stream, wherein the first encoding parameter set is associated with a first subband index; applying, at a second distribution matcher, a second encoding parameter set of the plurality of encoding parameter sets to a second subset of the bit stream, wherein the second encoding parameter set is associated with a second subband index; transmitting, on a first subband corresponding to the first subband index, a first modulated bit stream corresponding to the first distribution matcher; and transmitting, on a second subband corresponding to the second subband index, a second modulated bit stream corresponding to the second distribution matcher.

Aspect 2: The method of aspect 1, further comprising: transmitting, to the base station, a capability of the UE to support a plurality of distribution matchers, wherein the configuration indicating the mapping between the plurality of subband indices and the plurality of encoding parameter sets is based at least in part on the transmitted capability.

Aspect 3: The method of any of aspects 1 through 2, further comprising: identifying a capability of the UE to support a subset of the plurality of encoding parameter sets; and selecting the subset of the plurality of encoding parameter sets from the plurality of encoding parameter sets based at least in part on the received configuration, wherein the subset of the plurality of encoding parameter sets includes the first encoding parameter set and the second encoding parameter set.

Aspect 4: The method of any of aspects 1 through 3, further comprising: determining that the first subset of the bit stream is associated with the first subband index and the second subset of the bit stream is associated with the second subband index; identifying the first encoding parameter set based at least in part on the mapping between the first subband index and the first encoding parameter set; and identifying the second encoding parameter set based at least in part on the mapping between the second subband index and the second encoding parameter set.

Aspect 5: The method of aspect 4, wherein identifying the first encoding parameter set further comprises: identifying a modulation order and a distribution matcher parameter associated with the first distribution matcher, wherein applying the first encoding parameter set comprises applying the modulation order and the distribution matcher parameter at the first distribution matcher.

Aspect 6: The method of any of aspects 4 through 5, wherein identifying the second encoding parameter set further comprises: identifying a modulation order and a distribution matcher parameter associated with the second distribution matcher, wherein applying the second encoding parameter set comprises applying the modulation order and the distribution matcher parameter at the second distribution matcher.

Aspect 7: The method of any of aspects 4 through 6, wherein the first encoding parameter set comprises a first distribution matcher distribution value and the second encoding parameter set comprises a second distribution matcher distribution value.

Aspect 8: The method of any of aspects 1 through 7, further comprising: generating a first output sequence based at least in part on applying the first encoding parameter set at the first distribution matcher; and generating a second output sequence based at least in part on applying the second encoding parameter set at the second distribution matcher.

Aspect 9: The method of aspect 8, further comprising: concatenating the first output sequence and the second output sequence to generate a concatenated sequence; and applying channel coding to the concatenated sequence based at least in part on a code rate parameter.

Aspect 10: The method of aspect 9, wherein the code rate parameter is included in the first encoding parameter set and the second encoding parameter set.

Aspect 11: The method of any of aspects 9 through 10, wherein a common code rate parameter is associated with the first encoding parameter set and the second encoding parameter set.

Aspect 12: The method of any of aspects 1 through 11, further comprising: receiving, from the base station, a control signaling comprising the configuration indicating the mapping between the plurality of subband indices and the plurality of encoding parameter sets.

Aspect 13: The method of aspect 12, wherein the control signaling comprises at least one of a downlink control information and a radio resource control signaling.

Aspect 14: The method of any of aspects 1 through 13, wherein the first subband index and the second subband index are associated with at least one of different subcarriers and different subband channels.

Aspect 15: A method for wireless communication at a base station, comprising: identifying a configuration indicating a mapping between a plurality of subband indices and a plurality of encoding parameter sets; applying, at a first distribution matcher, a first encoding parameter set of the plurality of encoding parameter sets to a first subset of a bit stream, wherein the first encoding parameter set is associated with a first subband index; applying, at a second distribution matcher, a second encoding parameter set of the plurality of encoding parameter sets to a second subset of the bit stream, wherein the second encoding parameter set is associated with a second subband index; transmitting, on a first subband corresponding to the first subband index, a first modulated bit stream corresponding to the first distribution matcher; and transmitting, on a second subband corresponding to the second subband index, a second modulated bit stream corresponding to the second distribution matcher.

Aspect 16: The method of aspect 15, further comprising: receiving, from a UE, a capability of the UE to support a plurality of distribution matchers; and transmitting, to the UE, the configuration indicating the mapping between the plurality of subband indices and the plurality of encoding parameter sets, wherein the configuration is identified based at least in part on the received capability.

Aspect 17: The method of any of aspects 15 through 16, further comprising: determining that the first subset of the bit stream is associated with the first subband index and the second subset of the bit stream is associated with the second subband index; identifying the first encoding parameter set based at least in part on the mapping between the first subband index and the first encoding parameter set; and identifying the second encoding parameter set based at least in part on the mapping between the second subband index and the second encoding parameter set.

Aspect 18: The method of aspect 17, wherein identifying the first encoding parameter set further comprises: identifying a modulation order and a distribution matcher parameter associated with the first distribution matcher, wherein applying the first encoding parameter set comprises applying the modulation order and the distribution matcher parameter at the first distribution matcher.

Aspect 19: The method of any of aspects 17 through 18, wherein identifying the second encoding parameter set further comprises: identifying a modulation order and a distribution matcher parameter associated with the second distribution matcher, wherein applying the second encoding parameter set comprises applying the modulation order and the distribution matcher parameter at the second distribution matcher.

Aspect 20: The method of any of aspects 17 through 19, wherein the first encoding parameter set comprises a first distribution matcher distribution value and the second encoding parameter set comprises a second distribution matcher distribution value.

Aspect 21: The method of any of aspects 15 through 20, further comprising: generating a first output sequence based at least in part on applying the first encoding parameter set at the first distribution matcher; and generating a second output sequence based at least in part on applying the second encoding parameter set at the second distribution matcher.

Aspect 22: The method of aspect 21, further comprising: concatenating the first output sequence and the second output sequence to generate a concatenated sequence;

and applying channel coding to the concatenated sequence based at least in part on a code rate parameter.

Aspect 23: The method of aspect 22, wherein the code rate parameter is included in the first encoding parameter set and the second encoding parameter set.

Aspect 24: The method of any of aspects 22 through 23, wherein a common code rate parameter is associated with the first encoding parameter set and the second encoding parameter set.

Aspect 25: The method of any of aspects 15 through 24, further comprising: transmitting, to a UE, a control signaling comprising the configuration indicating the mapping between the plurality of subband indices and the plurality of encoding parameter sets.

Aspect 26: The method of aspect 25, wherein the control signaling comprises at least one of a downlink control information and a radio resource control signaling.

Aspect 27: The method of any of aspects 15 through 26, wherein the first subband index and the second subband index are associated with at least one of different subcarriers and different subband channels.

Aspect 28: An apparatus for wireless communication at a UE, comprising a processor; memory coupled with the processor; and instructions stored in the memory and executable by the processor to cause the apparatus to perform a method of any of aspects 1 through 14.

Aspect 29: An apparatus for wireless communication at a UE, comprising at least one means for performing a method of any of aspects 1 through 14.

Aspect 30: A non-transitory computer-readable medium storing code for wireless communication at a UE, the code comprising instructions executable by a processor to perform a method of any of aspects 1 through 14.

Aspect 31: An apparatus for wireless communication at a base station, comprising a processor; memory coupled with the processor; and instructions stored in the memory and executable by the processor to cause the apparatus to perform a method of any of aspects 15 through 27.

Aspect 32: An apparatus for wireless communication at a base station, comprising at least one means for performing a method of any of aspects 15 through 27.

Aspect 33: A non-transitory computer-readable medium storing code for wireless communication at a base station, the code comprising instructions executable by a processor to perform a method of any of aspects 15 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a configuration indicating a mapping between a plurality of subband indices and a plurality of encoding parameter sets;
   applying, at a first distribution matcher, a first encoding parameter set of the plurality of encoding parameter sets to a first subset of a bit stream, wherein the first encoding parameter set is associated with a first subband index;
   applying, at a second distribution matcher, a second encoding parameter set of the plurality of encoding parameter sets to a second subset of the bit stream, wherein the second encoding parameter set is associated with a second subband index;
   transmitting, on a first subband corresponding to the first subband index, a first modulated bit stream corresponding to the first distribution matcher; and
   transmitting, on a second subband corresponding to the second subband index, a second modulated bit stream corresponding to the second distribution matcher.

2. The method of claim 1, further comprising:
   transmitting, to the base station, a capability of the UE to support a plurality of distribution matchers, wherein the configuration indicating the mapping between the plurality of subband indices and the plurality of encoding parameter sets is based at least in part on the transmitted capability.

3. The method of claim 1, further comprising:
   identifying a capability of the UE to support a subset of the plurality of encoding parameter sets; and
   selecting the subset of the plurality of encoding parameter sets from the plurality of encoding parameter sets based at least in part on the received configuration, wherein the subset of the plurality of encoding parameter sets includes the first encoding parameter set and the second encoding parameter set.

4. The method of claim 1, further comprising:
   determining that the first subset of the bit stream is associated with the first subband index and the second subset of the bit stream is associated with the second subband index;
   identifying the first encoding parameter set based at least in part on the mapping between the first subband index and the first encoding parameter set; and
   identifying the second encoding parameter set based at least in part on the mapping between the second subband index and the second encoding parameter set.

5. The method of claim 4, wherein identifying the first encoding parameter set further comprises:
   identifying a modulation order and a distribution matcher parameter associated with the first distribution matcher, wherein applying the first encoding parameter set comprises applying the modulation order and the distribution matcher parameter at the first distribution matcher.

6. The method of claim 4, wherein identifying the second encoding parameter set further comprises:
   identifying a modulation order and a distribution matcher parameter associated with the second distribution matcher, wherein applying the second encoding parameter set comprises applying the modulation order and the distribution matcher parameter at the second distribution matcher.

7. The method of claim 4, wherein the first encoding parameter set comprises a first distribution matcher distribution value and the second encoding parameter set comprises a second distribution matcher distribution value.

8. The method of claim 1, further comprising:
   generating a first output sequence based at least in part on applying the first encoding parameter set at the first distribution matcher; and
   generating a second output sequence based at least in part on applying the second encoding parameter set at the second distribution matcher.

9. The method of claim 8, further comprising:
   concatenating the first output sequence and the second output sequence to generate a concatenated sequence; and
   applying channel coding to the concatenated sequence based at least in part on a code rate parameter.

10. The method of claim 9, wherein the code rate parameter is included in the first encoding parameter set and the second encoding parameter set.

11. The method of claim 9, wherein a common code rate parameter is associated with the first encoding parameter set and the second encoding parameter set.

12. The method of claim 1, further comprising:
   receiving, from the base station, a control signaling comprising the configuration indicating the mapping between the plurality of subband indices and the plurality of encoding parameter sets.

13. The method of claim 12, wherein the control signaling comprises at least one of a downlink control information and a radio resource control signaling.

14. The method of claim 1, wherein the first subband index and the second subband index are associated with at least one of different subcarriers and different subband channels.

15. A method for wireless communication at a base station, comprising:
identifying a configuration indicating a mapping between a plurality of subband indices and a plurality of encoding parameter sets;
applying, at a first distribution matcher, a first encoding parameter set of the plurality of encoding parameter sets to a first subset of a bit stream, wherein the first encoding parameter set is associated with a first subband index;
applying, at a second distribution matcher, a second encoding parameter set of the plurality of encoding parameter sets to a second subset of the bit stream, wherein the second encoding parameter set is associated with a second subband index;
transmitting, on a first subband corresponding to the first subband index, a first modulated bit stream corresponding to the first distribution matcher; and
transmitting, on a second subband corresponding to the second subband index, a second modulated bit stream corresponding to the second distribution matcher.

16. The method of claim 15, further comprising:
receiving, from a user equipment (UE), a capability of the UE to support a plurality of distribution matchers; and
transmitting, to the UE, the configuration indicating the mapping between the plurality of subband indices and the plurality of encoding parameter sets, wherein the configuration is identified based at least in part on the received capability.

17. The method of claim 15, further comprising:
determining that the first subset of the bit stream is associated with the first subband index and the second subset of the bit stream is associated with the second subband index;
identifying the first encoding parameter set based at least in part on the mapping between the first subband index and the first encoding parameter set; and
identifying the second encoding parameter set based at least in part on the mapping between the second subband index and the second encoding parameter set.

18. The method of claim 17, wherein identifying the first encoding parameter set further comprises:
identifying a modulation order and a distribution matcher parameter associated with the first distribution matcher, wherein applying the first encoding parameter set comprises applying the modulation order and the distribution matcher parameter at the first distribution matcher.

19. The method of claim 17, wherein identifying the second encoding parameter set further comprises:
identifying a modulation order and a distribution matcher parameter associated with the second distribution matcher, wherein applying the second encoding parameter set comprises applying the modulation order and the distribution matcher parameter at the second distribution matcher.

20. The method of claim 17, wherein the first encoding parameter set comprises a first distribution matcher distribution value and the second encoding parameter set comprises a second distribution matcher distribution value.

21. The method of claim 15, further comprising:
generating a first output sequence based at least in part on applying the first encoding parameter set at the first distribution matcher; and
generating a second output sequence based at least in part on applying the second encoding parameter set at the second distribution matcher.

22. The method of claim 21, further comprising:
concatenating the first output sequence and the second output sequence to generate a concatenated sequence; and
applying channel coding to the concatenated sequence based at least in part on a code rate parameter.

23. The method of claim 22, wherein the code rate parameter is included in the first encoding parameter set and the second encoding parameter set.

24. The method of claim 22, wherein a common code rate parameter is associated with the first encoding parameter set and the second encoding parameter set.

25. The method of claim 15, further comprising:
transmitting, to a user equipment (UE), a control signaling comprising the configuration indicating the mapping between the plurality of subband indices and the plurality of encoding parameter sets.

26. The method of claim 25, wherein the control signaling comprises at least one of a downlink control information and a radio resource control signaling.

27. The method of claim 15, wherein the first subband index and the second subband index are associated with at least one of different subcarriers and different subband channels.

28. An apparatus for wireless communication at a user equipment (UE), comprising:
a processor;
memory coupled with the processor; and
instructions stored in the memory and executable by the processor to cause the apparatus to:
receive, from a base station, a configuration indicating a mapping between a plurality of subband indices and a plurality of encoding parameter sets;
apply, at a first distribution matcher, a first encoding parameter set of the plurality of encoding parameter sets to a first subset of a bit stream, wherein the first encoding parameter set is associated with a first subband index;
apply, at a second distribution matcher, a second encoding parameter set of the plurality of encoding parameter sets to a second subset of the bit stream, wherein the second encoding parameter set is associated with a second subband index;
transmit, on a first subband corresponding to the first subband index, a first modulated bit stream corresponding to the first distribution matcher; and
transmit, on a second subband corresponding to the second subband index, a second modulated bit stream corresponding to the second distribution matcher.

29. The apparatus of claim 28, wherein the instructions are further executable by the processor to cause the apparatus to:
transmit, to the base station, a capability of the UE to support a plurality of distribution matchers, wherein the configuration indicating the mapping between the plurality of subband indices and the plurality of encoding parameter sets is based at least in part on the transmitted capability.

30. An apparatus for wireless communication at a base station, comprising:
- a processor;
- memory coupled with the processor; and
- instructions stored in the memory and executable by the processor to cause the apparatus to:
  - identify a configuration indicating a mapping between a plurality of subband indices and a plurality of encoding parameter sets;
  - apply, at a first distribution matcher, a first encoding parameter set of the plurality of encoding parameter sets to a first subset of a bit stream, wherein the first encoding parameter set is associated with a first subband index;
  - apply, at a second distribution matcher, a second encoding parameter set of the plurality of encoding parameter sets to a second subset of the bit stream, wherein the second encoding parameter set is associated with a second subband index;
  - transmit, on a first subband corresponding to the first subband index, a first modulated bit stream corresponding to the first distribution matcher; and
  - transmit, on a second subband corresponding to the second subband index, a second modulated bit stream corresponding to the second distribution matcher.

* * * * *